(12) United States Patent
Kim et al.

(10) Patent No.: US 12,447,972 B2
(45) Date of Patent: Oct. 21, 2025

(54) METHOD AND APPARATUS FOR RECOGNIZING DRIVING INFORMATION BY USING PLURALITY OF MAGNETIC SENSORS

(71) Applicant: JEONGSEOK CHEMICAL CORPORATION, Jeollabuk-do (KR)

(72) Inventors: Yong-Hyun Kim, Jeollabuk-do (KR); Young-Gil Ma, Jeollabuk-do (KR); Dae-Won Kim, Jeollabuk-do (KR)

(73) Assignee: JEONGSEOK CHEMICAL CORPORATION, Jeollabuk-Do (KR)

( * ) Notice: Subject to any disclaimer, the term of this patent is extended or adjusted under 35 U.S.C. 154(b) by 96 days.

(21) Appl. No.: 18/287,417

(22) PCT Filed: Apr. 12, 2022

(86) PCT No.: PCT/KR2022/005292
§ 371 (c)(1),
(2) Date: Oct. 18, 2023

(87) PCT Pub. No.: WO2022/231173
PCT Pub. Date: Nov. 3, 2022

(65) Prior Publication Data
US 2024/0199029 A1    Jun. 20, 2024

(30) Foreign Application Priority Data
Apr. 27, 2021    (KR) ......................... 10-2021-0054364

(51) Int. Cl.
*B60W 40/06*    (2012.01)
*B60W 50/00*    (2006.01)
(Continued)

(52) U.S. Cl.
CPC ............ *B60W 40/06* (2013.01); *B60W 50/00* (2013.01); *B60W 60/00* (2020.02); *G06F 18/20* (2023.01);
(Continued)

(58) Field of Classification Search
CPC ...................................................... B60W 40/06
See application file for complete search history.

(56) References Cited

U.S. PATENT DOCUMENTS 3,550,716 A * 12/1970 Wickstrom ............ B60K 31/04
318/8
3,575,255 A * 4/1971 Wickstrom .......... G05D 1/0263
340/905
(Continued)

FOREIGN PATENT DOCUMENTS

AU        2375470      *  6/1972
CN      103 345 839 A     10/2013
(Continued)

*Primary Examiner* — Michael A Berns
(74) *Attorney, Agent, or Firm* — BakerHostetler

(57) ABSTRACT

Disclosed herein are a method and apparatus for recognizing driving information using multiple sensors. The method for recognizing driving information according to an embodiment of the present disclosure includes generating a magnetic sensing signal from magnetic paint applied to road markings, generating a frequency-converted signal using the magnetic sensing signal, and generating driving information for a vehicle using the frequency-converted signal.

12 Claims, 27 Drawing Sheets

(51) Int. Cl.
 *B60W 60/00* (2020.01)
 *G06F 18/20* (2023.01)
(52) U.S. Cl.
 CPC .............. *B60W 2050/0057* (2013.01); *B60W 2050/0059* (2013.01); *B60W 2420/403* (2013.01); *B60W 2420/50* (2013.01)

(56) References Cited

U.S. PATENT DOCUMENTS

| | | | | |
|---|---|---|---|---|
| 3,653,456 | A * | 4/1972 | Uemura | G05D 1/0263 180/168 |
| 4,990,841 | A * | 2/1991 | Elder | G05D 1/0263 318/587 |
| 10,810,447 | B2 * | 10/2020 | Yoon | G08G 1/0133 |
| 10,969,245 | B2 * | 4/2021 | Yamamoto | G05D 1/0259 |
| 11,789,092 | B2 * | 10/2023 | Lazar | G01R 33/0005 360/119.11 |
| 11,912,282 | B2 * | 2/2024 | Hong | B60W 40/105 |
| 12,049,228 | B2 * | 7/2024 | Kim | G05D 1/0265 |
| 12,054,894 | B2 * | 8/2024 | Kim | H01F 7/20 |
| 2018/0283904 | A1 | 10/2018 | Yamamoto et al. | |
| 2021/0010214 | A1 * | 1/2021 | Bell | G08G 1/09623 |
| 2021/0300381 | A1 | 9/2021 | Hong et al. | |
| 2023/0240895 | A1 * | 8/2023 | Kim | A61H 3/066 607/54 |
| 2024/0199029 | A1 * | 6/2024 | Kim | G06F 18/20 |

FOREIGN PATENT DOCUMENTS

| | | |
|---|---|---|
| GB | 1 345 329 A | 1/1974 |
| JP | 2001-67588 A | 3/2001 |
| JP | 3707345 B2 | 10/2005 |
| JP | 2017-83189 A | 5/2017 |
| KR | 2007-0042599 A | 4/2007 |
| KR | 20190115503 A | 10/2019 |
| KR | 10-2122747 B1 | 6/2020 |
| KR | 102321567 B1 | 11/2021 |

* cited by examiner

| DIMENSION AND ELEMENT | 1D, TWO UNIT ELEMENTS | NUMBER OF TYPES OF INFORMATION THAT CAN BE PROVIDED | 2D, 2 × 2 UNIT ELEMENTS | NUMBER OF TYPES OF INFORMATION THAT CAN BE PROVIDED |
|---|---|---|---|---|
| COMBINATION OF UNIT INFORMATION | (N,S) | 4 | (N,S) × (N,S) | 16 |
| | (R,G,B) | 9 | (R,G,B) × (R,G,B) | 81 |
| | (N,S) × (R,G,B) | 36 | $(N,S)^2 \times (R,G,B)^2$ | 1296 |

| | R (RED) | G (GREEN) | B (BLUE) |
|---|---|---|---|
| N-POLE | 0 | 1 | 2 |
| S-POLE | 3 | 4 | 5 |

| DIMENSION AND ELEMENT | 1D, TWO UNIT ELEMENTS | NUMBER OF TYPES OF INFORMATION THAT CAN BE PROVIDED | 2D, 2 × 2 UNIT ELEMENTS | NUMBER OF TYPES OF INFORMATION THAT CAN BE PROVIDED |
|---|---|---|---|---|
| COMBINATION OF UNIT INFORMATION | (N,S) | 4 | (N,S) × (N,S) | 16 |
| | (R,G,B) | 9 | (R,G,B) × (R,G,B) | 81 |
| | (N,S) × (R,G,B) | 36 | $(N,S)^2 \times (R,G,B)^2$ | 1296 |

| | R (RED) | G (GREEN) | B (BLUE) |
|---|---|---|---|
| N-POLE | 0 | 1 | 2 |
| S-POLE | 3 | 4 | 5 |

METHOD AND APPARATUS FOR RECOGNIZING DRIVING INFORMATION BY USING PLURALITY OF MAGNETIC SENSORS

CROSS-REFERENCE TO RELATED APPLICATIONS

This application is a National Stage of International patent application PCT/KR2022/005292, filed on Apr. 12, 2022, which claims priority to foreign Korean patent application No. KR 10-2021-0054364, filed on Apr. 27, 2021, the disclosures of which are incorporated by reference in their entireties.

FIELD OF THE INVENTION

The present disclosure relates generally to a method and apparatus of recognizing driving information by using multiple magnetic sensors, and more particularly, to technology for recognizing driving information from magnetic paint applied to road markings.

BACKGROUND

Unless otherwise indicated herein, the materials described in this section are not the prior art with regard to the claims in this application, and are not admitted to be prior art by inclusion in this section.

Magnetic sensors may be used for the driving systems of autonomous vehicles. For example, magnetic patterns constructed on road markings may be read using the magnetic sensors and used for autonomous driving.

Such magnetic sensors detect a magnetic field changing over time, and autonomous vehicles are operated by interpreting the detected magnetic field using a computer. That is, a magnetic sensor installed in a vehicle being operated senses that a magnetic field, generated from road markings on which a magnetic pattern is formed by including magnetic particles, changes over time, thereby generating magnetic sensing information required for autonomous driving.

Meanwhile, while a vehicle is being operated, the vehicle itself may vibrate due to the engine thereof or vibration may be caused due to an uneven road surface, in which case the magnetic sensor installed in the vehicle also vibrates. Accordingly, the distance between the magnetic sensor and a lane is changed, and the vibration results in noise in a magnetic sensing signal sensed by the magnetic sensor.

Also, magnetic materials, among the materials of the vehicle, also vibrate, and the magnetic sensor also detects signals generated by the vibration of the magnetic materials. These signals correspond to noise and pose an obstacle to detecting information for operating the autonomous vehicle.

SUMMARY OF THE INVENTION

An object of the present disclosure is to accurately detect a magnetic signal from magnetic paint applied to road markings by using multiple magnetic sensors.

Another object of the present disclosure is to efficiently remove noise based on signals sensed using multiple magnetic sensors when a magnetic signal sensitive to noise is detected.

A further object of the present disclosure is to further remove noise using a vibration frequency detected using a vibration sensor and to improve a Signal-to-Noise Ratio (SNR) by solving a problem that is caused when a signal is detected using only a magnetic sensor.

Yet another object of the present disclosure is to efficiently recognize a pattern by a magnetic signal or optical signal from magnetic paint applied to road markings, thereby providing driving information to the control module of an autonomous vehicle and a driver.

Still another object of the present disclosure is to generate driving information by combining a magnetic sensing signal with an optical sensing signal, thereby providing a lot of various information to an autonomous vehicle and a driver, compared to when only the magnetic sensing signal is used.

Still another object of the present disclosure is to efficiently detect a magnetic signal from magnetic paint applied to the ground in order to recognize a pattern for providing pedestrians with information such as guidance, exits and locations.

The objects of the present disclosure are not limited to the above objects, and it will be apparent that other objects can be derived from the following description.

Technical Solution

In order to accomplish the above objects, a method for recognizing driving information according to an embodiment of the present disclosure includes generating a magnetic sensing signal from magnetic paint applied to road markings, generating a frequency-converted signal using the magnetic sensing signal, and generating driving information for a vehicle using the frequency-converted signal.

Here, the frequency-converted signal may be generated by generating detection signals by detecting the magnetic sensing signal at preset periods, generating average signals by averaging a preset number of detection signals, collecting a number of average signals corresponding to a preset conversion unit or collecting the average signals for a preset time period, and performing frequency conversion thereon.

Here, the magnetic sensing signal may include a first magnetic sub-signal generated from the magnetic paint through a first magnetic sensor and a second magnetic sub-signal generated from the magnetic paint through a second magnetic sensor.

Here, the frequency-converted signal may be generated using a noise-reduced signal generated using the difference between the first magnetic sub-signal and the second magnetic sub-signal.

Here, the noise-reduced signal may be generated using the differences between the average signals corresponding to the first magnetic sub-signal and the average signals corresponding to the second magnetic sub-signal.

Here, the method may further include detecting a vibration frequency by a vibration sensor installed in the vehicle while the magnetic sensing signal is being generated.

Here, the frequency-converted signal may be generated using an additional noise-reduced signal acquired by further removing noise corresponding to the vibration frequency from the noise-reduced signal.

Here, the method may further include generating direction information of the magnetic paint using the difference between the time at which the first magnetic sub-signal is received and the time at which the second magnetic sub-signal is received.

Here, the method may further include generating an optical sensing signal from the magnetic paint, and generating the driving information may comprise generating the driving information using any one or more of the frequency-converted signal, or the optical sensing signal, or a combination thereof.

Here, the magnetic sensing signal may correspond to a one-dimensional magnetic pattern or a two-dimensional magnetic pattern.

Here, the optical sensing signal may be configure to subdivide the magnetic pattern corresponding to the magnetic sensing signal, thereby increasing the amount of information per unit length or unit area, compared to when only the magnetic sensing signal is used.

Also, in order to accomplish the above objects, an apparatus for recognizing driving information according to an embodiment of the present disclosure includes a magnetic sensor for generating a magnetic sensing signal from magnetic paint applied to road markings, a frequency conversion unit for generating a frequency-converted signal using the magnetic sensing signal, and a control unit for generating driving information for a vehicle using the frequency-converted signal.

Here, the frequency-converted signal may be generated by generating detection signals by detecting the magnetic sensing signal at preset periods, generating average signals by averaging a preset number of detection signals, collecting a number of average signals corresponding to a preset conversion unit or collecting the average signals for a preset time period, and performing frequency conversion thereon.

Here, the magnetic sensing signal may include a first magnetic sub-signal generated from the magnetic paint through a first magnetic sensor and a second magnetic sub-signal generated from the magnetic paint through a second magnetic sensor.

Here, the frequency-converted signal may be generated using a noise-reduced signal generated using the difference between the first magnetic sub-signal and the second magnetic sub-signal.

Here, the noise-reduced signal may be generated using the differences between the average signals corresponding to the first magnetic sub-signal and the average signals corresponding to the second magnetic sub-signal.

Here, the apparatus may further include a vibration sensor that is configured to detect a vibration frequency while the magnetic sensing signal is being generated.

Here, the frequency-converted signal may be generated using an additional noise-reduced signal acquired by further removing noise corresponding to the vibration frequency from the noise-reduced signal.

Here, the control unit may generate direction information of the magnetic paint using the difference between the time at which the first magnetic sub-signal is received and the time at which the second magnetic sub-signal is received.

Here, the apparatus may further include an optical sensor for generating an optical sensing signal from the magnetic paint, and the control unit may generate the driving information using any one or more of the frequency-converted signal, or the optical sensing signal, or a combination thereof.

Here, the magnetic sensing signal may correspond to a one-dimensional magnetic pattern or a two-dimensional magnetic pattern.

Here, the optical sensing signal may be configured to subdivide the magnetic pattern corresponding to the magnetic sensing signal, thereby increasing the amount of information per unit length or unit area, compared to when only the magnetic sensing signal is used.

Also, in order to accomplish the above objects, a method for recognizing pedestrian guidance using multiple magnetic sensors according to an embodiment of the present disclosure includes generating a magnetic sensing signal from magnetic paint applied to a ground, generating a frequency-converted signal using the magnetic sensing signal, and generating pedestrian guidance using the frequency-converted signal.

Here, the frequency-converted signal may be generated by generating detection signals by detecting the magnetic sensing signal at preset periods, generating average signals by averaging a preset number of detection signals, collecting a number of average signals corresponding to a preset conversion unit or collecting the average signals for a preset time period, and performing frequency conversion thereon.

Here, the magnetic sensing signal may include a first magnetic sub-signal generated from the magnetic paint through a first magnetic sensor and a second magnetic sub-signal generated from the magnetic paint through a second magnetic sensor.

Here, the frequency-converted signal may be generated using a noise-reduced signal generated using the difference between the first magnetic sub-signal and the second magnetic sub-signal.

Here, the noise-reduced signal may be generated using the differences between the average signals corresponding to the first magnetic sub-signal and the average signals corresponding to the second magnetic sub-signal.

Here, the method for recognizing pedestrian guidance using multiple magnetic sensors according to an embodiment of the present disclosure may further include generating direction information of the magnetic paint using the difference between the time at which the first magnetic sub-signal is received and the time at which the second magnetic sub-signal is received.

Here, the method for recognizing pedestrian guidance using multiple magnetic sensors according to an embodiment of the present disclosure may further include generating an optical sensing signal from the magnetic paint, and generating the pedestrian guidance may comprise generating the pedestrian guidance using any one or more of the frequency-converted signal, or the optical sensing signal, or a combination thereof.

Here, the magnetic sensing signal may correspond to a one-dimensional magnetic pattern or a two-dimensional magnetic pattern.

Here, the optical sensing signal may be configured to subdivide the magnetic pattern corresponding to the magnetic sensing signal, thereby increasing the amount of information per unit length or unit area, compared to when only the magnetic sensing signal is used.

Also, in order to accomplish the above objects, an apparatus for recognizing pedestrian guidance using multiple magnetic sensors according to an embodiment of the present disclosure includes a magnetic sensor for generating a magnetic sensing signal from magnetic paint applied to a ground, a frequency conversion unit for generating a frequency-converted signal using the magnetic sensing signal, and a control unit for generating pedestrian guidance using the frequency-converted signal.

Here, the frequency conversion unit may generate the frequency-converted signal by generating detection signals by detecting the magnetic sensing signal at preset periods, generating average signals by averaging a preset number of detection signals, collecting a number of average signals corresponding to a preset conversion unit or collecting the average signals for a preset time period, and performing frequency conversion thereon.

Here, the magnetic sensing signal may include a first magnetic sub-signal generated from the magnetic paint through a first magnetic sensor and a second magnetic sub-signal generated from the magnetic paint through a second magnetic sensor.

Here, the frequency-converted signal may be generated using a noise-reduced signal generated using the difference between the first magnetic sub-signal and the second magnetic sub-signal.

Here, the noise-reduced signal may be generated using the differences between the average signals corresponding to the first magnetic sub-signal and the average signals corresponding to the second magnetic sub-signal.

Here, the control unit may generate direction information of the magnetic paint using the difference between the time at which the first magnetic sub-signal is received and the time at which the second magnetic sub-signal is received.

Here, the apparatus for recognizing pedestrian guidance using multiple magnetic sensors according to an embodiment of the present disclosure may further include an optical sensor for generating an optical sensing signal from the magnetic paint, and the control unit may generate the pedestrian guidance using any one or more of the frequency-converted signal, or the optical sensing signal, or a combination thereof.

Here, the magnetic sensing signal may correspond to a one-dimensional magnetic pattern or a two-dimensional magnetic pattern.

Here, the optical sensing signal may be configured to subdivide the magnetic pattern corresponding to the magnetic sensing signal, thereby increasing the amount of information per unit length or unit area, compared to when only the magnetic sensing signal is used.

Advantageous Effects

According to the present disclosure, a magnetic signal from magnetic paint applied to road markings may be accurately detected using multiple magnetic sensors.

Also, the present disclosure may efficiently remove noise based on signals sensed using multiple magnetic sensors when a magnetic signal sensitive to noise is detected.

Also, the present disclosure may further remove noise using a vibration frequency detected using a vibration sensor and improve a Signal-to-Noise Ratio (SNR) by solving a problem that is caused when a signal is detected using only a magnetic sensor.

Also, the present disclosure efficiently recognizes a pattern by a magnetic signal or an optical signal from magnetic paint applied to road markings, thereby providing driving information to the control module of an autonomous vehicle and a driver.

Also, the present disclosure generates driving information by combining a magnetic sensing signal with an optical sensing signal, thereby providing a lot of various information to an autonomous vehicle and a driver, compared to when only the magnetic sensing signal is used.

Also, the present disclosure may efficiently detect a magnetic signal from magnetic paint applied to the ground in order to recognize a pattern for providing pedestrian guidance.

The effects of the present embodiments are not limited to the above-mentioned effects, and other effects that have not been mentioned can be clearly understood by those skilled in the art from the appended claims.

DETAILED DESCRIPTION

Figure 1:
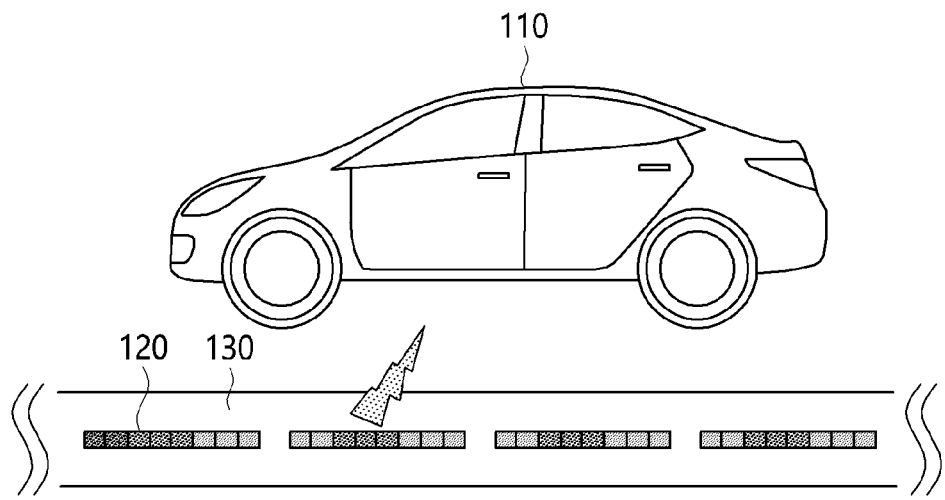
FIG. 1 is a view illustrating a use case of an apparatus for recognizing driving information according to an embodiment of the present disclosure.

The present disclosure will be described in detail below with reference to the accompanying drawings. Repeated descriptions and descriptions of known functions and configurations which have been deemed to unnecessarily obscure the gist of the present disclosure will be omitted below. The embodiments of the present disclosure are intended to fully describe the present disclosure to a person having ordinary knowledge in the art to which the present disclosure pertains. Accordingly, the shapes, sizes, etc. of components in the drawings may be exaggerated in order to make the description clearer.

Hereinafter, a preferred embodiment of the present disclosure will be described in detail with reference to the accompanying drawings.

FIG. 1 is a view illustrating a use case of an apparatus for recognizing driving information according to an embodiment of the present disclosure.

Referring to FIG. 1, the apparatus for recognizing driving information according to an embodiment of the present disclosure is installed in a transportation means for autonomous driving, such as an autonomous vehicle 110, thereby operating when the autonomous vehicle 110 is driving, and the apparatus may recognize information stored in a road marking 130 based on a magnetic field caused by magnetic paint 120 included in the road marking 130 on a road.

Here, the magnetic paint 120 may form a specific magnetic pattern using magnetic properties, and may alternatively form a specific optical pattern using optical properties that differ in color.

Accordingly, the apparatus for recognizing driving information, which is operating by being installed in the autonomous vehicle 110, may read the pattern of the magnetic paint 120 included in the road marking 130, recognize driving information included in the corresponding pattern, and provide the recognized information to the autonomous vehicle 110 or a user riding on the autonomous vehicle 110.

For example, the driving information may include various kinds of information required for driving, such as a speed limit, a location, nearby buildings, nearby tourist spot information, and the like.

Figure 2:
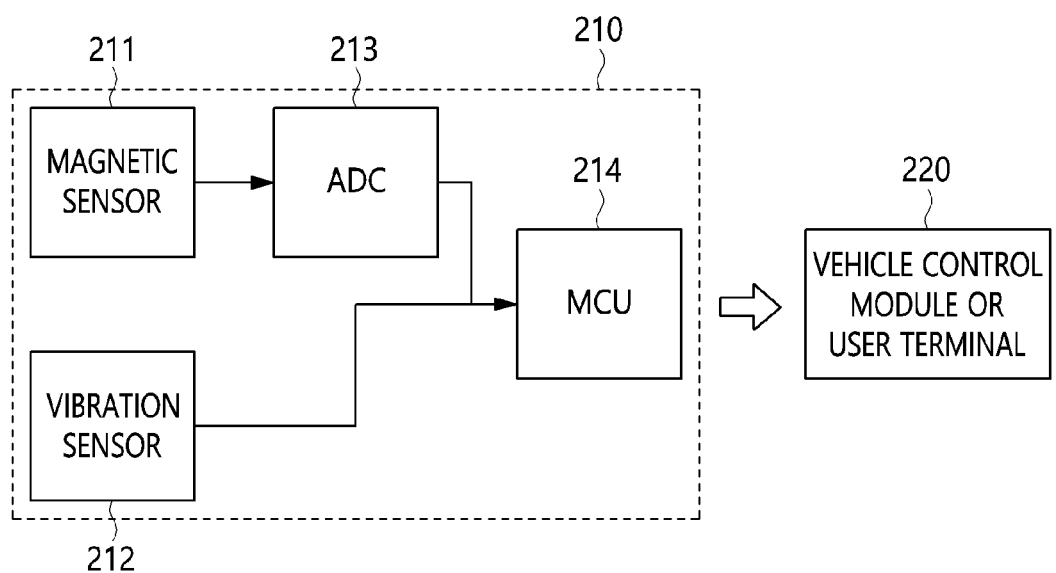
FIG. 2 is a block diagram illustrating an apparatus for recognizing driving information according to an embodiment of the present disclosure.

FIG. 2 is a block diagram illustrating an apparatus for recognizing driving information according to an embodiment of the present disclosure.

Referring to FIG. 2, the driving information recognition apparatus 210 according to an embodiment of the present disclosure may include a magnetic sensor 211, a vibration sensor 212, an Analog-Digital Converter (ADC) 213, and a processor (e.g., an MCU, a MICOM, or the like) 214.

Here, the driving information recognition apparatus 210 according to an embodiment of the present disclosure may generate driving information from magnetic paint applied to road markings and provide the driving information to a vehicle control module or a user terminal 220 through wired or wireless communication.

The magnetic sensor 211 may detect a magnetic sensing signal from magnetic paint applied to road markings.

Here, because the magnetic sensing signal is an analog signal, it may be converted into a digital signal through the analog-digital converter (ADC) 213, as will be described later.

Here, the magnetic sensor 211 may also detect a noise signal due to the earth's magnetic field or an environment in which a magnetic field is generated or induced from nearby iron (Fe), or the like. Therefore, the magnetic sensor 211 according to an embodiment of the present disclosure may use a magnetic sensor that detects a dynamic signal rather than a static signal.

Here, no signal is detected when the magnetic sensor for detecting a dynamic signal remains stationary over the magnetic paint in which magnetic information is recorded, and a signal may be detected only when the magnetic sensor is moving. That is, a sensor capable of detecting a change in a magnetic signal over time may be used.

The vibration sensor 212 detects a vibration frequency caused by the vibration of a vehicle while a magnetic sensing signal is being generated.

Here, the vibration frequency may be used in order to reduce noise caused by the vibration of the vehicle.

For example, vibration is caused due to uneven road conditions when a vehicle is driving, in which case the magnetic sensor installed in the vehicle also vibrates. As a result, the distance between the magnetic sensor and a road marking drawn on a road continuously changes, which causes noise even in the magnetic sensing signal sensed by the magnetic sensor.

In the present disclosure, the vibration frequency detected by the vibration sensor 212 is used in order to reduce such noise. Here, reducing noise using the vibration frequency will be described in detail later with reference to FIGS. 10 to 11.

Here, the ADC 213 may convert the analog magnetic signal detected by the magnetic sensor 211 into a digital signal such that the MCU 214 processes the same.

Here, the ADC 213 may be an ADC having the resolution of 12 bits or higher and a sampling rate equal to or greater than 1 kS/s.

Here, the MCU 214 may generate driving information by processing the digital signal acquired through the ADC.

More specifically, the MCU 214 performs Fast Fourier Transform (FFT) on the digital signal, thereby extracting a period of the pattern recorded in the magnetic paint, that is, a frequency.

Here, the MCU 214 may generate driving information based on the frequency and transfer the same to the vehicle control module or the user terminal 220, and it is desirable to transfer the driving information analyzed through fast Fourier transform to the vehicle control module or the user terminal 220 within one second from the time of signal detection.

Here, a communication method for transferring the driving information may be a short-range wireless communication method, such as Wi-Fi, near-field communication (NFC), Bluetooth, or the like, or a wired communication method.

Here, the driving information may be provided to a user after being converted into a tactile (e.g., vibration) or auditory (e.g., sound) signal through the user terminal 220, and may be visually provided through the display of the user terminal 220 or the vehicle control module 220.

The reason for varying the provision method as described above is for increasing the transfer efficiency and the amount of information provided to the user within the same amount of time.

Figure 3:
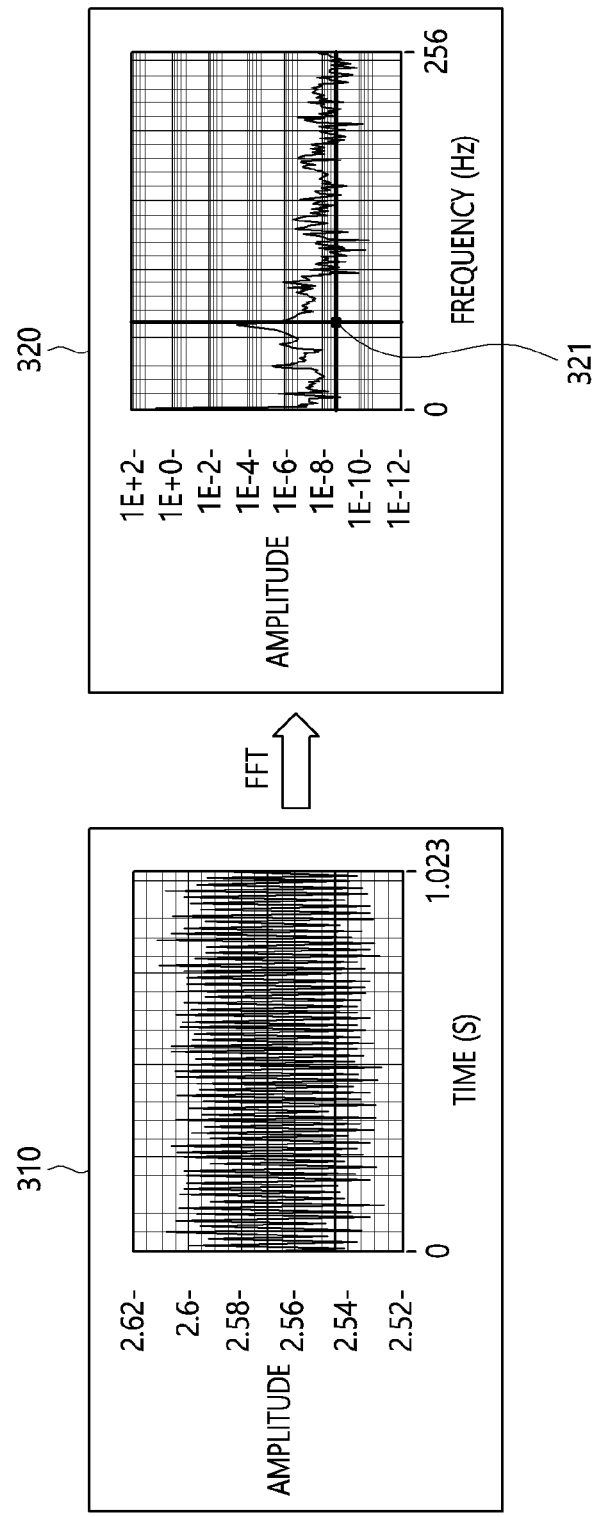
FIG. 3 is a view illustrating an example of a process of generating a frequency-converted signal according to the present disclosure.

FIG. 3 is a graph illustrating a process of generating a frequency-converted signal according to an embodiment of the present disclosure.

Referring to FIG. 3, the left graph 310 is a graph of an alternating magnetic pattern that is measured by reading the same into Field-Programmable Gate Arrays (FPGAs) using a magnetic sensor after the alternating magnetic paint corresponding to 60 Hz is constructed.

Here, the left graph 310 is a graph illustrating 1024 signals collected for 1.024 seconds by taking the average of 200 detection signals, generated by detecting a signal acquired from a single analog magnetic sensor through FPGAs every five microseconds (μs), as a single signal.

Here, the span between the minimum strength and the maximum strength (amplitude) in the left graph 310 may vary within a signal range of about 100 mV (from about 2.52 V to 2.62 V).

Also, the right graph 320 illustrated in FIG. 3 is a graph of the result of fast Fourier transform performed on the 1024 signals, and it can be seen that, after the alternating magnetic pattern is drawn so as to correspond to 60 Hz, when the signal detected using the magnetic sensor is converted, the signal of 60 Hz (321) is clearly differentiated from other signals, whereby driving information, and the like may be provided using the magnetic pattern signal. That is, because a magnetic signal has characteristics in which it is very sensitive to noise and in which the measurement value thereof fluctuates depending on various kinds of noise, if the magnetic signal is not efficiently measured, it is difficult to acquire desired driving information from the magnetic signal measured from the applied magnetic paint. Therefore, by collecting a sufficient number of detection signals, calculating the average thereof, collecting the calculated average values, and performing frequency conversion thereon, a desired frequency pattern may be detected from the magnetic paint applied to the ground.

However, when a magnetic signal is detected using a single magnetic sensor, there may be a lack of means for reducing noise. Therefore, noise is reduced using multiple magnetic sensors, as will be described later, and a frequency corresponding to the alternating magnetic pattern may be more clearly detected.

Figure 4:
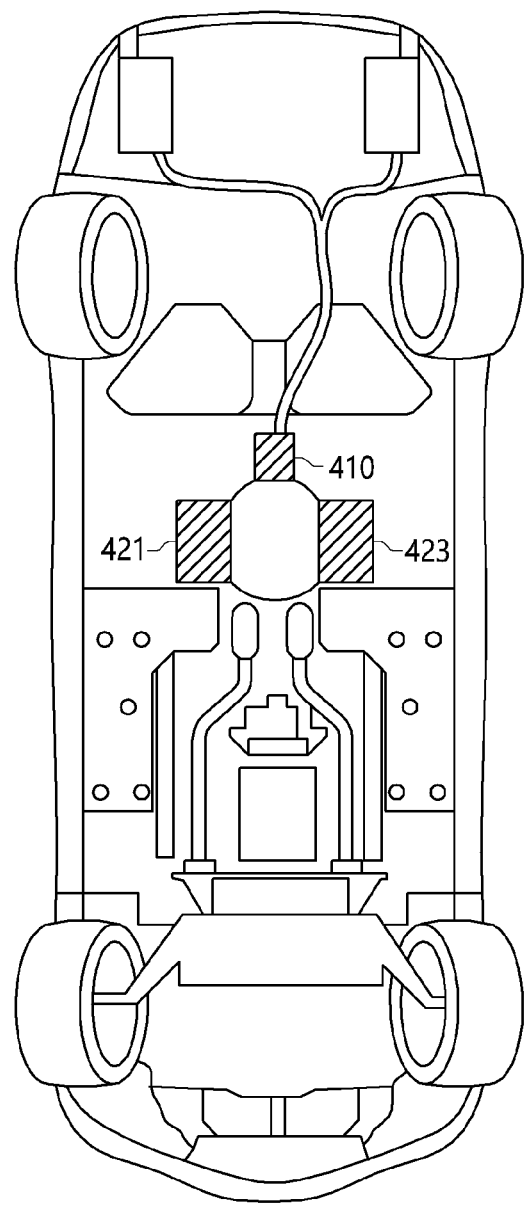
FIGS. 4 to 5 are structural diagrams illustrating an autonomous vehicle equipped with a driving information recognition apparatus including multiple magnetic sensors according to an embodiment of the present disclosure.
Figure 5:
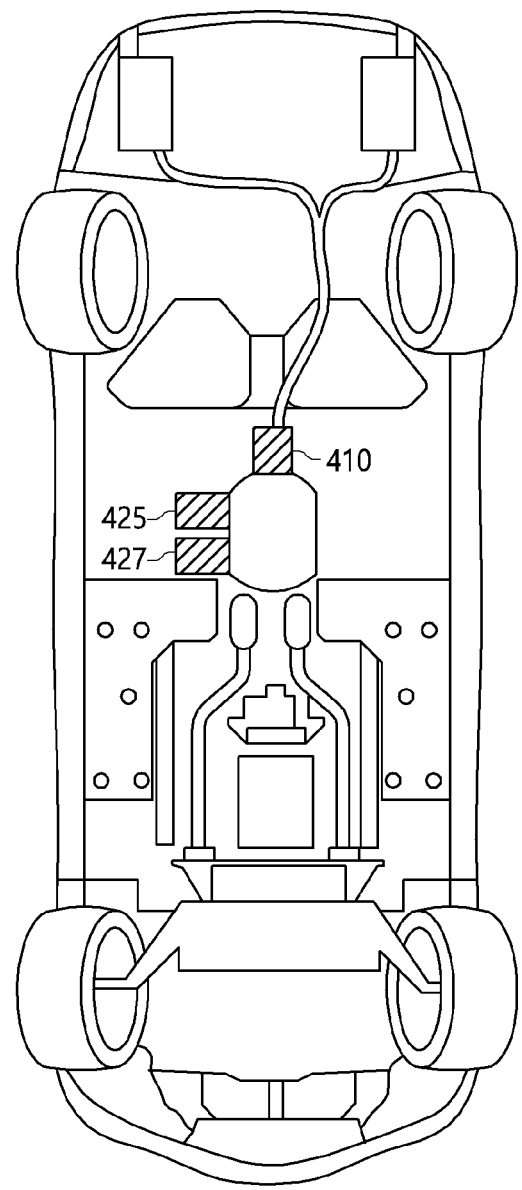

FIGS. 4 to 5 are structural diagrams illustrating an autonomous vehicle equipped with a driving information recognition apparatus including multiple magnetic sensors according to an embodiment of the present disclosure.

Referring to FIG. 4, the driving information recognition apparatus according to an embodiment of the present disclosure may operate by being installed in an autonomous vehicle, and may include two magnetic sensors 421 and 423 capable of detecting magnetic signals on the left and right sides of the vehicle and a center marker 410 through the center of the vehicle can be identified.

Here, the first magnetic sensor 421 for detecting a magnetic signal on the left side of the vehicle based on the center marker 410 and the second magnetic sensor 423 for detecting a magnetic signal on the right side of the vehicle based on the center marker 410 may be located so as to be spaced apart from each other.

In FIG. 4, the sensors are illustrated on the left and right sides relative to the center of the vehicle, but the first magnetic sensor 421 and the second magnetic sensor 423 may be installed so as to be located on the left and right sides of the vehicle.

Meanwhile, referring to FIG. 5, the driving information recognition apparatus according to an embodiment of the present disclosure is configured such that two magnetic sensors 425 and 427 capable of detecting magnetic signals are integrated on one side, and may include a center marker 410 through which the center of the vehicle can be identified.

Here, the driving information recognition apparatus including two magnetic sensors 421 and 423 or 425 and 427 according to an embodiment of the present disclosure may reduce noise using a time difference between magnetic signals detected by the respective magnetic sensors, as will be described later. Also, noise may be reduced by subtracting the magnetic signals detected by the respective magnetic sensors from each other.

Figure 6:
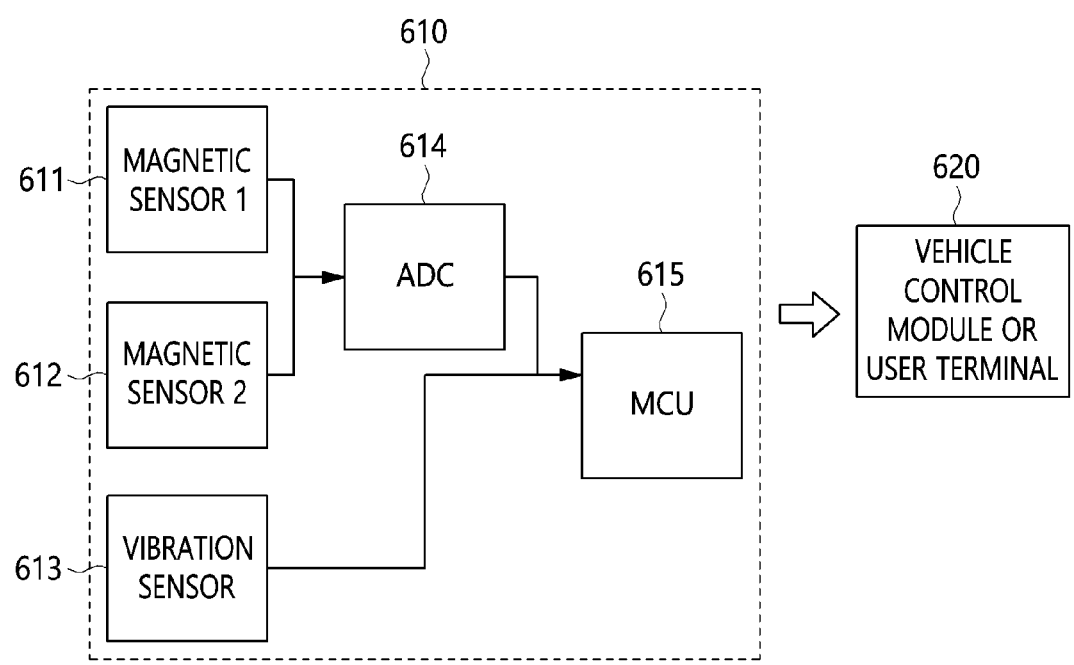
FIG. 6 is a block diagram illustrating a driving information recognition apparatus including multiple magnetic sensors according to an embodiment of the present disclosure.

FIG. 6 is a block diagram of a driving information recognition apparatus including multiple magnetic sensors according to an embodiment of the present disclosure.

Referring to FIG. 6, the driving information recognition apparatus 610 according to an embodiment of the present disclosure may include a first magnetic sensor 611, a second magnetic sensor 612, a vibration sensor 613, an Analog-Digital Converter (ADC) 614, a processor (e.g., an MCU, a MICOM, or the like) 615, and the like.

Here, the driving information recognition apparatus 610 according to an embodiment of the present disclosure may generate driving information from magnetic paint applied to road markings, as in the embodiment including a single magnetic sensor, and may provide the driving information to a vehicle control module or a user terminal 620 through wired or wireless communication.

Here, the first magnetic sensor 611 and the second magnetic sensor 612 may detect a magnetic signal from the magnetic paint applied to road markings on a road, and may detect the same magnetic signal from the same magnetic paint at different times.

Here, because the magnetic signal may be an analog signal, it may be converted into a digital signal through the analog-digital converter, as will be described later.

Here, the magnetic sensors 611 and 612 may also detect a noise signal generated from the earth's magnetic field or generated in an environment in which a magnetic field is generated or induced from nearby iron, or the like. Therefore, the magnetic sensor may use a magnetic sensor that detects a dynamic signal rather than a static signal.

The magnetic sensor for detecting a dynamic signal is not able to detect a signal when it remains stationary over the magnetic paint in which magnetic information is recorded, and is able to detect a signal only when it is moving. That is, a sensor capable of detecting a change in a magnetic signal over time may be used.

The vibration sensor 613 detects a vibration frequency caused by the vibration of the vehicle while a magnetic sensing signal is being generated.

Here, the vibration frequency may be used in order to reduce noise caused by the vibration of the vehicle.

For example, when a vehicle is driving, vibration is caused due to uneven road conditions, in which case the magnetic sensor installed in the vehicle also vibrates. As a result, the distance between the magnetic sensor and a road marking drawn on the road continuously changes, which causes noise even in the magnetic sensing signal sensed by the magnetic sensor.

In the present disclosure, the vibration frequency detected by the vibration sensor 613 is used in order to reduce such noise. Here, reducing noise using the vibration frequency will be described in detail later with reference to FIGS. 10 to 11.

Here, the analog-digital converter 614 may convert the analog magnetic signal detected by the first magnetic sensor 611 and the second magnetic sensor 612 into a digital signal such that the processor 615 processes the same.

Here, the analog magnetic signal detected through the first magnetic sensor 611 and the second magnetic sensor 612 may be the difference between the respective analog magnetic signals detected through the first magnetic sensor 611 and the second magnetic sensor 612, and it will be described in more detail later with reference to FIG. 7.

Here, the analog-digital converter 614 may be an ADC having the resolution of 12 bits or higher and a sampling rate equal to or greater than 1 kS/s.

Here, the processor 615 may generate driving information by processing the digital signal acquired through the analog-digital converter 714.

More specifically, the processor 615 performs Fast Fourier Transform (FFT) on the digital signal, thereby extracting a period of the pattern recorded in the magnetic paint, that is, a frequency.

Here, the processor 615 may generate driving information based on the frequency and transfer the same to the vehicle control module or the user terminal 620, and it is desirable to transfer the driving information analyzed through fast Fourier transform to the vehicle control module or the user terminal 620 within one second from the time of signal detection.

Here, a communication method for transferring the driving information may be a short-range wireless communication method, such as Wi-Fi, near-field communication (NFC), Bluetooth, or the like, or a wired communication method.

Here, the driving information may be provided to a user after being converted into a tactile (e.g., vibration) or auditory (e.g., sound) signal through the user terminal 620, and may be visually provided through the display of the user terminal or the vehicle control module 620.

The reason for varying the provision method as described above is for increasing the transfer efficiency and the amount of information provided to the user within the same amount of time.

Figure 7:
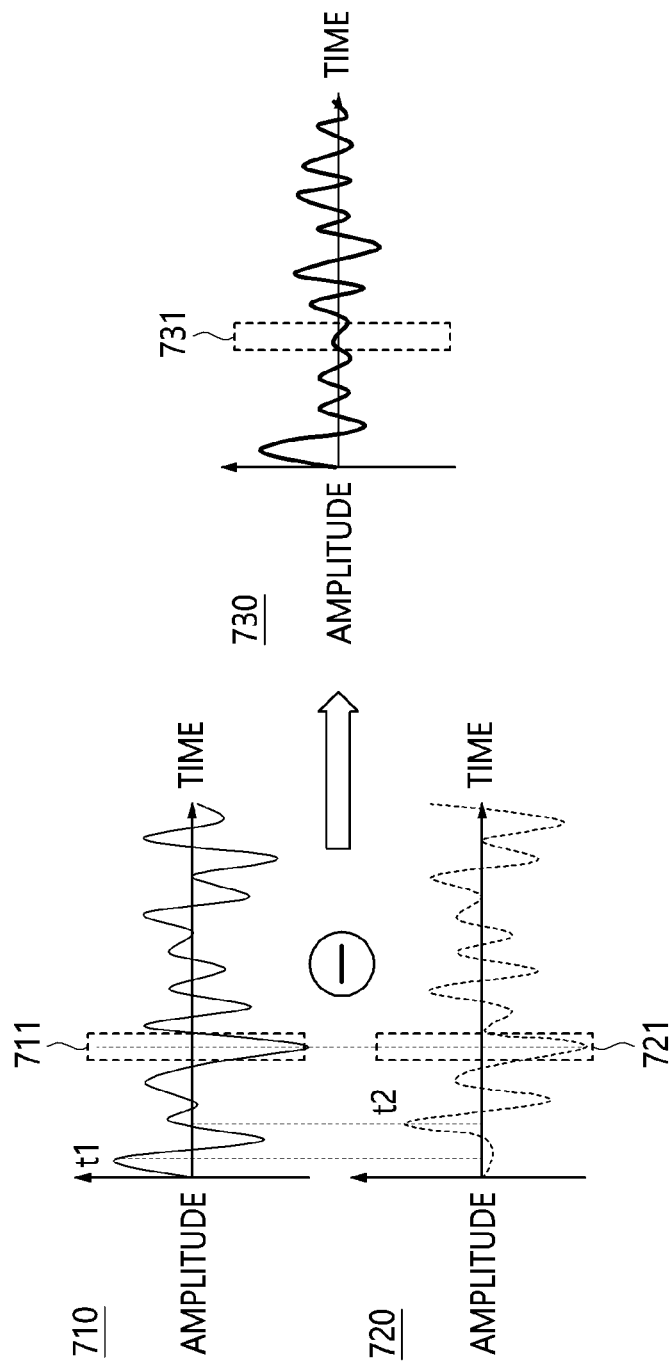
FIG. 7 is a graph illustrating a process of generating a noise-reduced signal according to an embodiment of the present disclosure.

FIG. 7 is a graph illustrating a process of generating a noise-reduced signal according to an embodiment of the present disclosure.

Referring to FIG. 7, a driving information recognition apparatus including two magnetic sensors according to an embodiment of the present disclosure may detect the same magnetic signal at different times.

For example, when the source of the magnetic signal is closer to a first magnetic sensor than a second magnetic sensor, a first magnetic sub-signal 710 may be detected through the first magnetic sensor t2-t1 earlier than a second magnetic sub-signal 720 that is detected through the second magnetic sensor.

However, a noise signal 711 detected by the first magnetic sensor and a noise signal 721 detected by the second magnetic sensor are input in the same time window without a time difference.

Accordingly, a noise-reduced signal 730 from which the noise signal 731 is removed may be generated by calculating the difference between the first magnetic sub-signal 710 and the second magnetic sub-signal 720, whereby the frequency recorded in the magnetic paint may be more clearly extracted.

Here, the noise-reduced signal 730 may alternatively be the differences between average signals corresponding to the first magnetic sub-signal 710 and average signals corresponding to the second magnetic sub-signal 720.

Also, the driving information recognition apparatus according to an embodiment of the present disclosure may be configured such that two magnetic sensors 425 and 427 for respectively detecting magnetic fields in different directions are integrated, as illustrated in FIG. 5.

More specifically, any one of the two magnetic sensors (425 or 427) may be installed in the driving information recognition apparatus in the direction in which a magnetic field in the vertical direction can be detected, and the other magnetic sensor 427 or 425 may be installed in the driving information recognition apparatus in the direction in which a magnetic field in the horizontal direction can be detected.

Here, when the magnetic field in the vertical direction, coming from the paint with which a magnetic pattern is built, has the largest strength, a magnetic signal in the horizontal direction has a relatively small strength.

Here, the driving information recognition apparatus according to an embodiment of the present disclosure may integrate the first and second magnetic sensors therein such that the first magnetic sensor 425 detects a first magnetic sub-signal corresponding to a vertical magnetic field and such that the second magnetic sensor 427 detects a second magnetic sub-signal corresponding to a horizontal magnetic field.

Here, the driving information recognition apparatus according to an embodiment of the present disclosure may reduce a noise signal generated in the vicinity thereof by applying the two signals to the above-described method, thereby more clearly reading a signal intended to be detected from the paint.

Meanwhile, this method may also be the above-mentioned method of using the time difference in detection by the two sensors.

Figure 8:
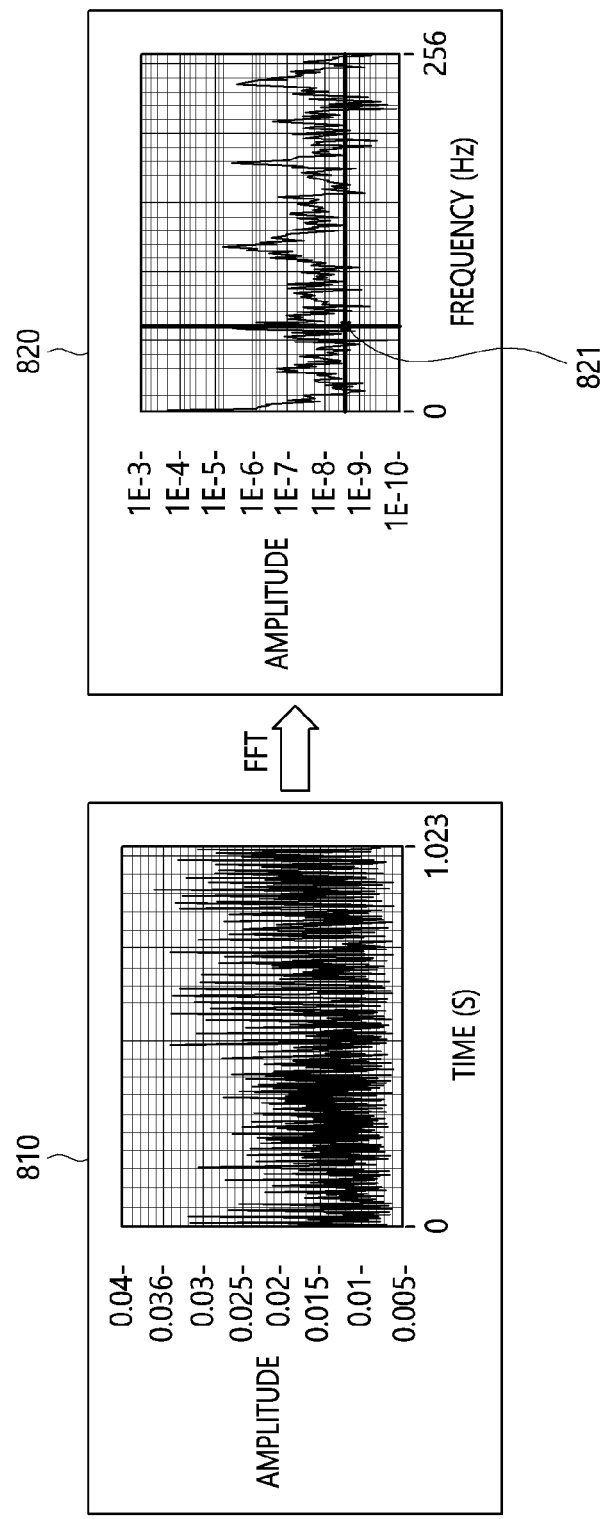
FIG. 8 is a graph illustrating a process of generating a frequency-converted signal using a noise-reduced signal according to an embodiment of the present disclosure.

FIG. 8 is a graph illustrating a process of generating a frequency-converted signal using a noise-reduced signal according to an embodiment of the present disclosure.

Referring to FIG. 8, the left graph 810 is a graph illustrating a noise-reduced signal, which is the difference between a first magnetic sub-signal and a second magnetic sub-signal detected using a first magnetic sensor and a second magnetic sensor after an alternating magnetic pattern corresponding to 60 Hz is constructed, as in FIG. 3.

When two magnetic sensors are used, noise may be reduced and the frequency recorded in magnetic paint may be more clearly extracted, as described above.

Here, the left graph 810 may be a graph illustrating 1024 signals collected for 1.024 seconds when the average of 200 detection signals, which are generated by detecting the difference between the first magnetic-sub signal and the second magnetic-sub signal through FPGAs every 5 µs, is taken as a single signal.

Alternatively, the left graph 810 may be a graph illustrating 1024 signals acquired by collecting the difference between respective averages, each being the average of 200 detection signals generated by detecting each of the first magnetic sub-signal and the second magnetic sub-signal through FPGAs every 5 µs, for 1.024 seconds.

Here, the span between the minimum strength and the maximum strength (amplitude) in the left graph 810 may vary within a signal range of about 35 mV (from 0.005 V to 0.04 V), and may be about three times less than the amplitude (2.62 V–2.52 V=100 mV) in the case in which detection is performed using a single magnetic sensor.

Also, the right graph 820 illustrated in FIG. 8 is a graph of a result of fast Fourier transform performed on the 1024 signals and is the case in which the alternating magnetic pattern drawn to correspond to 60 Hz is detected, and it can be seen that the magnetic pattern of 60 Hz (821) may be clearly identified because harmonics of 60 Hz, such as 60 Hz, 120 Hz, 180 Hz, and the like, appear well as the result of conversion of the noise-reduced signal.

Figure 9:
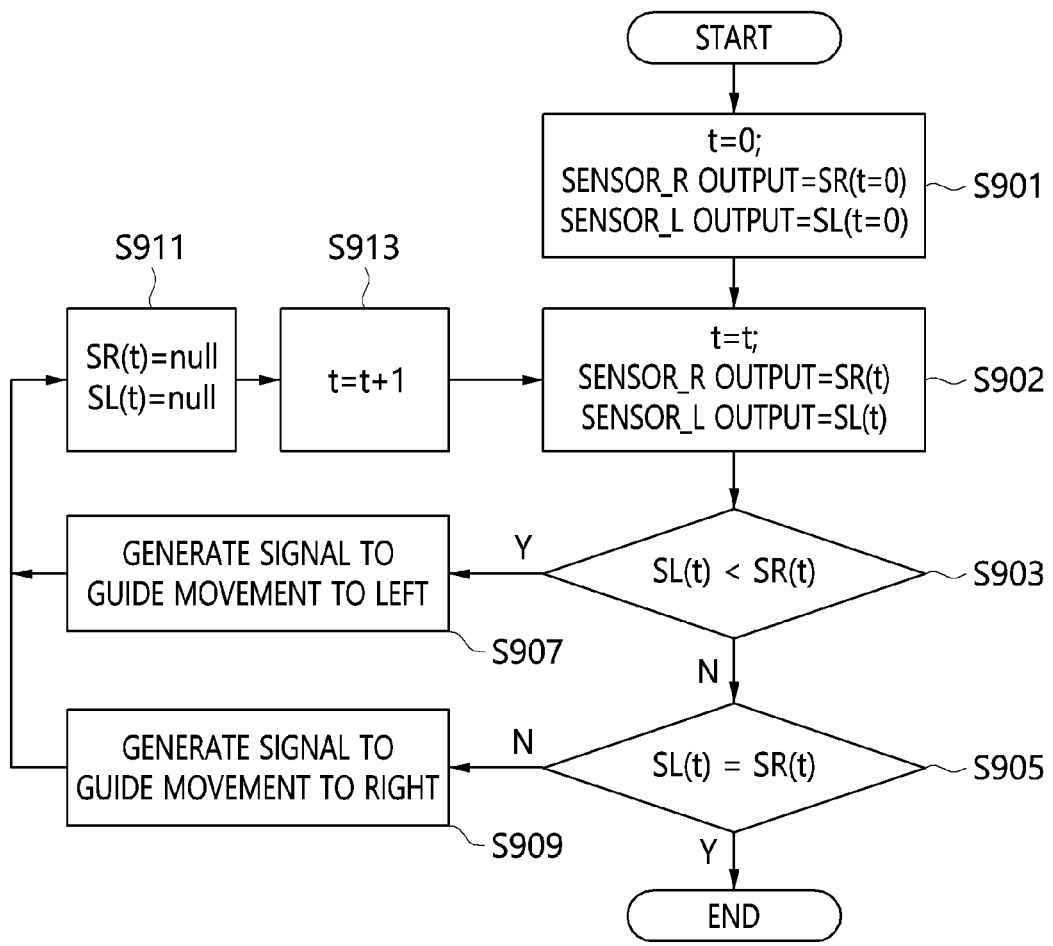
FIG. 9 is a flowchart illustrating a process of generating a driving guidance signal according to an embodiment of the present disclosure.

FIG. 9 is a flowchart of generation of a driving guidance signal according to an embodiment of the present disclosure.

According to an embodiment of the present disclosure, two magnetic sensors are installed at different locations in a driving information recognition apparatus, and one or more kinds of magnetic paint applied to road markings may be identified using relative signals detected by the two sensors.

Also, an embodiment of the present disclosure applies magnetic paint to lane markings drawn on a road, thereby guiding an autonomous vehicle to drive in the center of the lane between the lane markings.

For example, referring to FIG. 8, first, 0 is substituted into the variable 't', and the output of a first magnetic sensor, which is located on the right side of a vehicle, and the output of a second magnetic sensor, which is located on the left side of the vehicle, may be respectively defined as and initialized to SR(t=0) and SL(t=0) at step S801 according to an embodiment of the present disclosure.

Here, the variable 't' may correspond to time, and SR(t) and SL(t) may correspond to the outputs of the respective magnetic sensors, which change over time.

Then, as time changes, SR(t) and SL(t) are defined to correspond to the time at step S802, and SR(t) and SL(t) may be compared with each other at step S803.

Here, when it is determined at step S803 that SR(t) is greater than SL(t), a signal may be generated to guide the vehicle to move to the left on the road at step S807.

Also, it is determined at step S803 that SR(t) is not greater than SL(t), whether SR(t) and SL(t) are equal to each other may be checked at step S805.

When it is determined at step S805 that SL(t) is equal to SR(t), the above steps may be repeated by going back to the start.

Also, when it is determined at step S805 that SL(t) is not equal to SR(t), a signal may be generated to guide the vehicle to move to the right on the road at step S809.

After a signal is generated to guide the vehicle to move to the left or right, null is substituted into each of SR(t) and SL(t) at step S811, t+1 is substituted into the variable 't', and the process may be performed again from step S802 in order to again determine the current location of the vehicle.

Accordingly, the autonomous vehicle may be guided to drive in the center of a lane between load markings by repeatedly performing the above-described steps.

Figure 10:
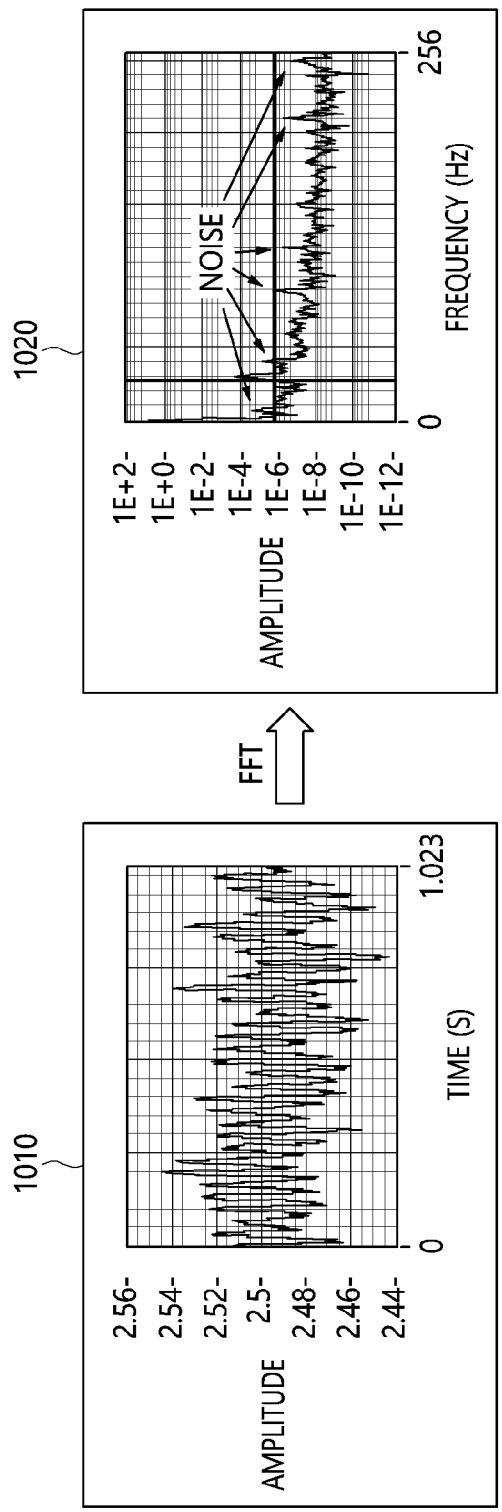
FIG. 10 is a view illustrating an example of noise included in a magnetic sensing signal according to the present disclosure.

FIG. 10 is a view illustrating an example of noise included in a magnetic sensing signal according to the present disclosure.

An autonomous vehicle configured to drive itself by recognizing a magnetic sensing signal interprets frequency data detected using a magnetic sensor and thereby drives itself.

That is, the magnetic sensor attached to the autonomous vehicle that is driving senses that a magnetic field, generated from road markings on which an alternating magnetic pattern is formed by including magnetic particles, changes over time.

Meanwhile, vibration is caused due to an uneven road surface while the autonomous vehicle is driving, in which case the magnetic sensor attached to the autonomous vehicle also vibrates. As a result, the distance between the magnetic sensor and the road markings continuously changes, whereby a magnetic signal sensed by the magnetic sensor is changed.

Also, magnetic materials, among the materials of the vehicle, also vibrate, and the magnetic sensor attached to the autonomous vehicle may also detect this signal.

These signals act as noise to the magnetic sensor, which is required to detect only a magnetic field coming from the road markings, and pose an obstacle to accurately detecting information about an alternating pattern of the road marking.

For example, referring to FIG. 10, the left graph 1010 is a graph of an alternating magnetic pattern that is measured by reading the same into Field-Programmable Gate Arrays (FPGAs) using a magnetic sensor after the alternating magnetic pattern corresponding to 30 Hz is constructed.

Here, the left graph 1010 corresponds to a magnetic sensing signal mixed with vibration noise, and the span between the minimum strength and the maximum strength (amplitude) may vary within a signal range of about 0.11 V (from about 2.44 V to 2.55 V).

Also, the right graph 1020 illustrated in FIG. 10 corresponds to an FFT spectrum acquired by performing Fourier transform on the left graph 1010, and it can be seen that multiple peaks (noise) are included therein. These peaks may correspond to noise sources capable of causing malfunction in driving of an autonomous vehicle.

In the present disclosure, a vibration frequency is detected using a vibration sensor in order to reduce these peaks generated from vibration, and noise arising from the vibration is removed based on the vibration frequency, whereby a magnetic signal may be more accurately sensed.

For example, when the vibration frequency detected by the vibration sensor is subtracted from the magnetic sensing signal detected by the magnetic sensor, only a magnetic signal coming from the road marking may be acquired.

Here, when the vibration frequency is applied to a noise-reduced signal according to an embodiment of the present disclosure, the noise caused by the vibration frequency is further removed from the noise-reduced signal generated based on the first magnetic sub-signal and the second magnetic sub-signal detected by the magnetic sensors, whereby an additional noise-reduced signal may be generated. Here, Fourier transform is performed on the additional noise-reduced signal, so noise is more effectively removed than when only multiple magnetic sensors are used. Accordingly, only a magnetic signal coming from the road marking may be acquired.

Figure 11:
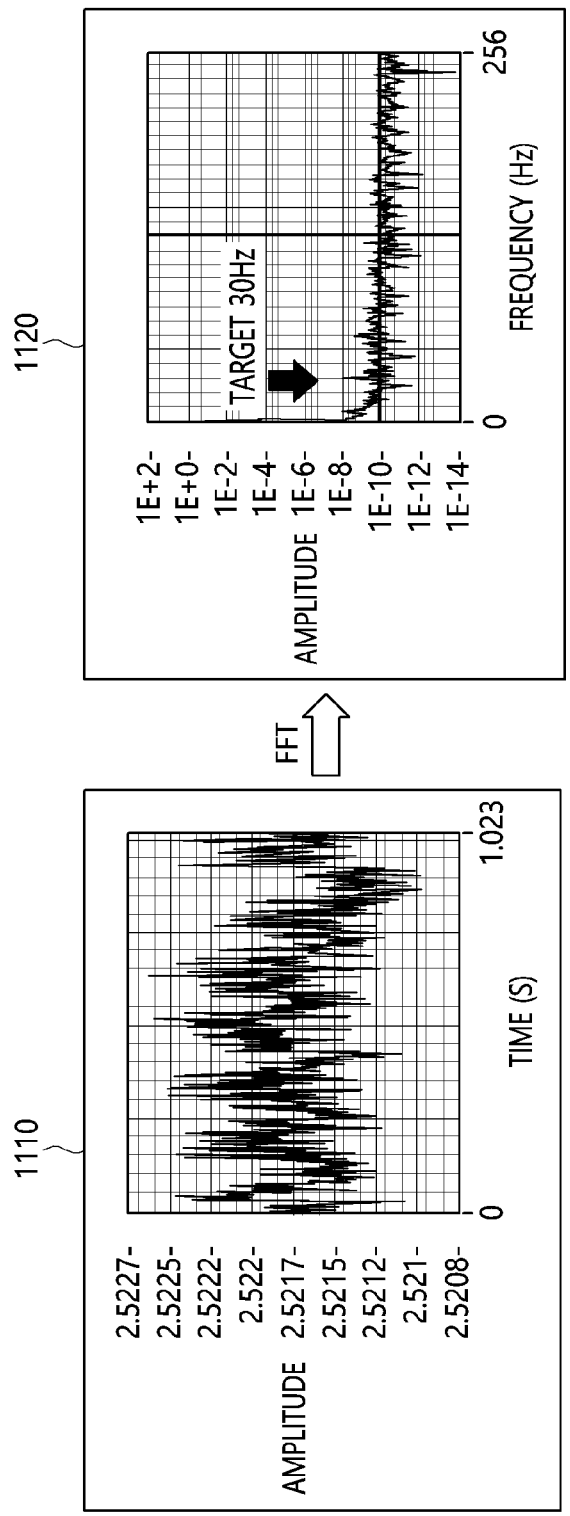
FIG. 11 is a graph illustrating an example of a process of generating a frequency-converted signal using a vibration frequency according to the present disclosure.

FIG. 11 is a graph illustrating an example of a process of generating a frequency-converted signal using a vibration frequency according to the present disclosure.

Referring to FIG. 11, the left graph 1110 corresponds to a magnetic sensing signal after noise acquired from a vibration sensor is removed from the left graph 1010 illustrated in FIG. 10, and it can be seen that the span between the minimum strength and the maximum strength (amplitude) varies within a signal range of about 0.018 V (from about 2.5208 V to 2.5226 V).

That is, it can be seen that the span between the minimum strength and the maximum strength is significantly decreased to 1/10, compared to before the vibration frequency is removed.

Also, the right graph 1120 illustrated in FIG. 11 corresponds to an FFT spectrum acquired by performing Fourier transform on the left graph 1110 illustrated in FIG. 11, and comparing this with the right graph 1020 illustrated in FIG. 10, it can be seen that the peaks arising from the noise sources disappear and only a target signal of 30 Hz is detected.

As described above, noise that is difficult to remove using only magnetic sensors is further removed using a vibration sensor, whereby a signal from a road marking may be clearly interpreted, which may considerably help in safe driving of an autonomous vehicle.

Figure 12:
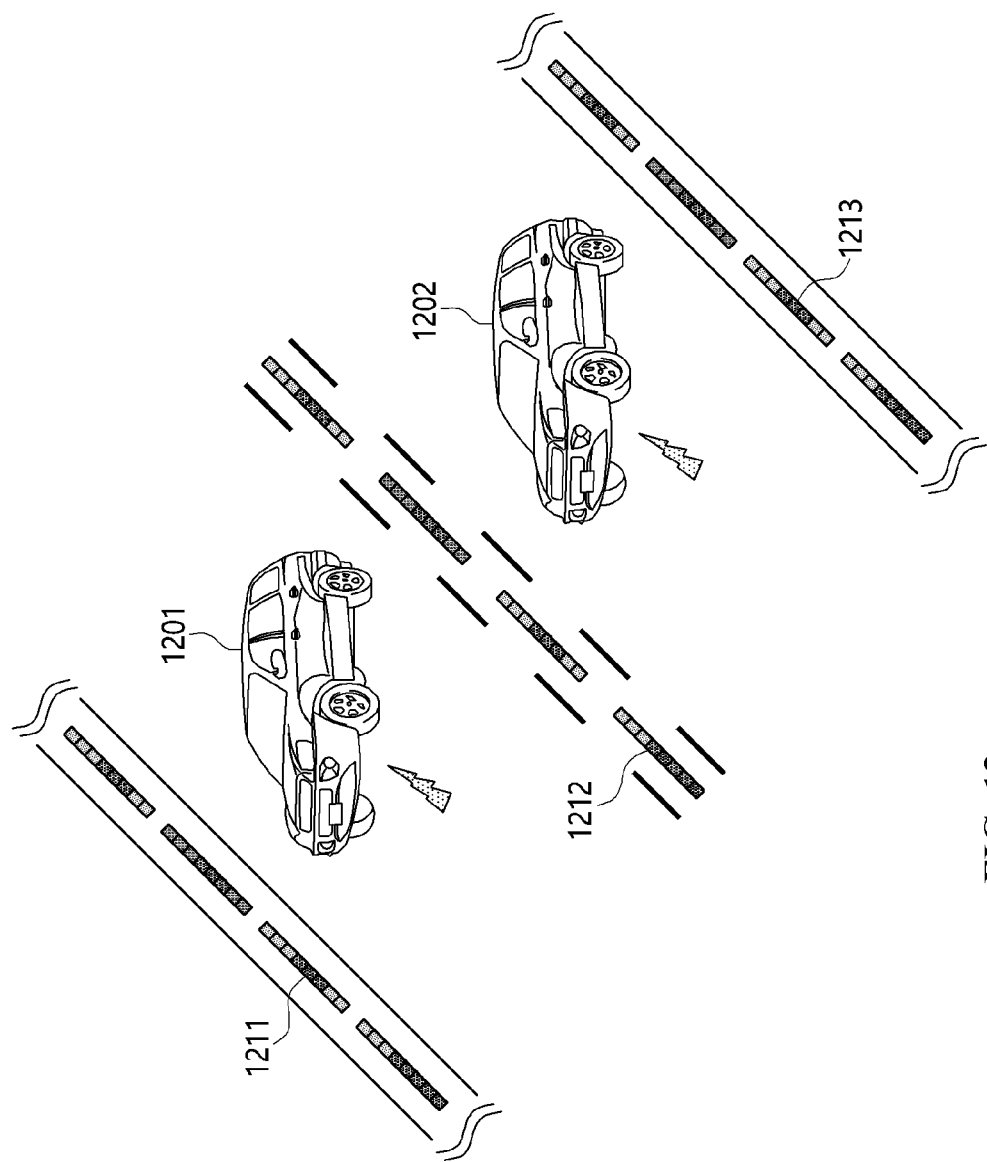
FIG. 12 is a view illustrating an example of application of multiple magnetic patterns to a road according to an embodiment of the present disclosure.

FIG. 12 is a view illustrating an example of application of multiple magnetic patterns to a road according to an embodiment of the present disclosure.

Referring to FIG. 12, two or more magnetic patterns 1211, 1212, and 1213 according to an embodiment of the present disclosure may be applied to lane markings drawn on a road.

Here, the first magnetic pattern 1211 and the second magnetic pattern 1212 applied to the lane markings drawn on both sides of the first lane in which a vehicle 1201 is driving are formed based on one direction such that the vehicle 1201 equipped with a driving information recognition apparatus is provided with magnetic sensing information.

Here, each of the first magnetic pattern 1211 and the second magnetic pattern 1212 may include information corresponding to the lane marking related thereto because the types of the lane markings differ from each other.

Also, the second magnetic pattern 1212 and the third magnetic pattern 1213 applied to the lane markings drawn on both sides of the second lane in which a vehicle 1202 is driving are formed based on one direction such that the vehicle 1202 equipped with a driving information recognition apparatus is provided with magnetic sensing information.

Here, each of the second magnetic pattern 1212 and the third magnetic pattern 1213 may include information corresponding to the lane marking related thereto because the types of the lane markings differ from each other.

Here, the respective magnetic patterns 1211, 1212, and 1213 may be formed to provide consistent driving information to the vehicles 1201 and 1202 driving in the corresponding lanes, or may be formed as different magnetic patterns so as to contain different pieces of information depending on the type of the lane marking.

Here, the locations of the vehicles 1201 and 1202, each equipped with the driving information recognition apparatus according to an embodiment of the present disclosure, may be detected through the strengths of the magnetic fields by the respective magnetic patterns 1211, 1212 and 1213, and this will be described in detail later with reference to FIG. 13.

Figure 13:
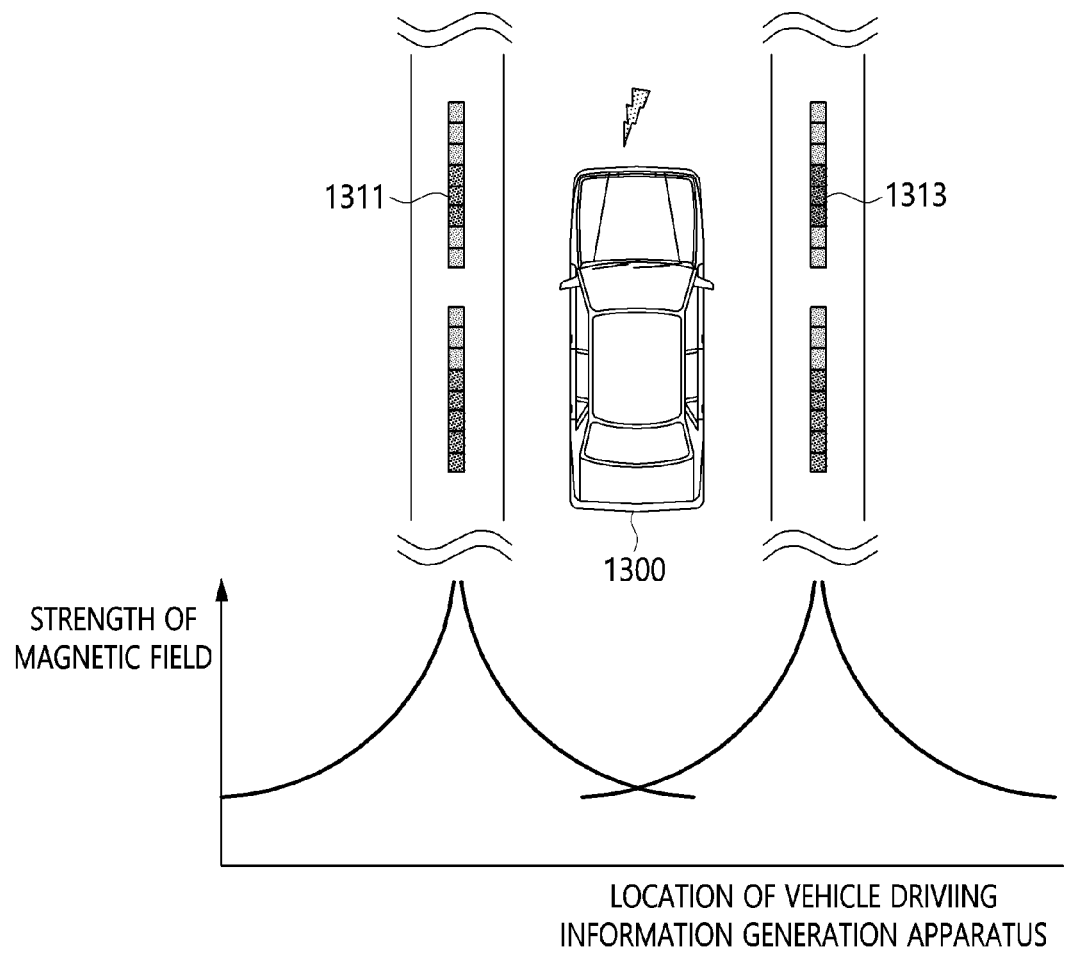
FIG. 13 is a graph illustrating the strength of a magnetic field depending on multiple magnetic patterns and the location of an autonomous vehicle equipped with a driving information recognition apparatus according to the present disclosure.

FIG. 13 is a graph illustrating the strength of a magnetic field depending on multiple magnetic patterns and the location of an autonomous vehicle equipped with a driving information recognition apparatus.

Referring to FIG. 13, the strengths of magnetic fields by a first magnetic pattern 1311 and a second magnetic pattern 1313 may vary depending on the location of an autonomous vehicle 1300 that is equipped with a driving information recognition apparatus and located between the first magnetic pattern 1311 and the second magnetic pattern 1313.

Here, when the autonomous vehicle 1300 according to an embodiment of the present disclosure comes closer to the first magnetic pattern 1311, the strength of the magnetic field by the first magnetic pattern 1311 increases, but when it comes closer to the second magnetic pattern 1313, the strength of the magnetic field by the second magnetic pattern 1313 increases. Accordingly, the autonomous vehicle 1300 equipped with the driving information recognition apparatus according to an embodiment of the present disclosure may detect the location thereof on the road.

Also, using the strengths of the magnetic fields by the respective magnetic patterns 1311 and 1313, the autonomous vehicle may be prevented from driving in another lane or a dangerous area and may be guided to drive along a safe route.

Here, the driving information recognition apparatus according to an embodiment of the present disclosure may include two magnetic sensors, thereby guiding the autonomous vehicle 1300 to drive in the center of a lane, as described above.

Figure 14:
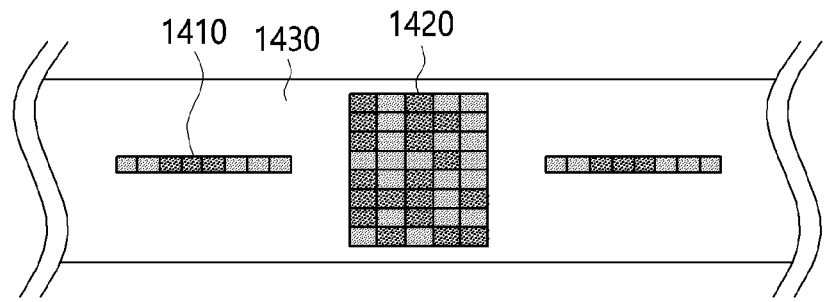
FIG. 14 is a view illustrating an example of a pattern of magnetic paint applied to road markings according to the present disclosure.

FIG. 14 is an exemplary view illustrating the pattern of magnetic paint applied to road markings according to the present disclosure.

According to an embodiment of the present disclosure, magnetic paint may be applied in a patterned form or an alternating pattern, whereby not only directional information but also location information and various other kinds of information may be provided.

Referring to FIG. 14, the patterns of magnetic paint applied to a lane marking 1430 according to an embodiment of the present disclosure may be formed as a one-dimensional pattern 1410, which is recorded in one dimension, and a two-dimensional pattern 1420, which is recorded in two dimensions.

Here, the one-dimensional pattern 1410 may provide information using a binary signal by setting the N-pole and S-pole of the magnetic paint to 1 and 0, respectively.

Here, describing an example of the one-dimensional pattern 1410, the magnetic pattern is formed using only the N-pole and the S-pole, as shown in Table 1, and location information (e.g., lane marking information or the like) may be provided using the binary signal of each pattern.

TABLE 1

| magnetic pattern | information |
|---|---|
| NNNNNNNS | solid yellow line (center line) |
| NNNNNNSS | broken yellow line |
| SSSSSSSN | solid yellow line + broken yellow line |
| SSSSSSNN | double yellow lines |
| NNSSSNNN | solid white line |
| NNNSSSNN | broken while line |
| SSNNNSSS | solid white line + broken white line |
| SSSNNNSS | double white lines |

Here, because the two-dimensional pattern 1420 can be formed like a Quick Response (QR) code, it may include more information than conventional patterns, and the above-described pieces of information may be visually or auditorily provided to a user by operating a magnetic field detection element (a magnetic sensor), or the like in conjunction with a user terminal, or the like.

Also, because the one-dimensional pattern 1410 and the two-dimensional patterns 1420 may include various colors, they may contain more various kinds of information by combining magnetic properties with optical properties.

Consequently, the one-dimensional pattern 1410 and the two-dimensional patterns 1420 may be formed using only an N-pole and an S-pole, or may be formed by adding three colors of red, green and blue (RGB) thereto.

Here, when magnetic properties are combined with optical properties, the amount of information capable of being contained in a pattern is exponentially increased, compared to when the pattern is formed using only the magnetic properties, and because information can be recorded based on a base-6 number system, which has higher operation efficiency than a binary number system (N, S), a greater amount of information may be recorded per unit length or unit area. This may improve the reliability of information, because the accuracy of an information amount is determined depending on the amount of initially input information when Artificial Intelligence (AI) is used for a mobile electronic communication device.

That is, the one-dimensional pattern 1410 and the two-dimensional pattern 1420 according to an embodiment of the present disclosure may provide much more information by changing a magnetic pattern in the form of binary bits into multiple bits.

Also, a specific pattern according to an embodiment of the present disclosure may enable a user to easily collect information by telling the location of an optical pattern using a simple magnetic pattern or by telling the location of a magnetic pattern using an optical pattern, and this will be described in detail with reference to FIG. 17.

Also, a specific pattern according to an embodiment of the present disclosure may be simply constructed, and has an advantage in that, when it is necessary to change information contained therein, the information may be easily modified.

Also, a specific pattern according to an embodiment of the present disclosure may be formed in various colors, and has an advantage in that an aesthetic impression may be secured because there is no limitation as to the color of paint.

Also, a specific pattern according to an embodiment of the present disclosure may provide information by combining a magnetic signal using a magnetic pattern with an optical signal using an optical pattern, or the magnetic signal and the optical signal may be formed to have the same pattern such that they are used in a mutually complementary manner.

For example, when the specific pattern according to an embodiment of the present disclosure is recorded using an N-pole and an S-pole, it is represented using respective colors corresponding to the poles, whereby the magnetic signal and the optical signal may be used in a mutually complementary manner.

Figures 15, 16, 17:
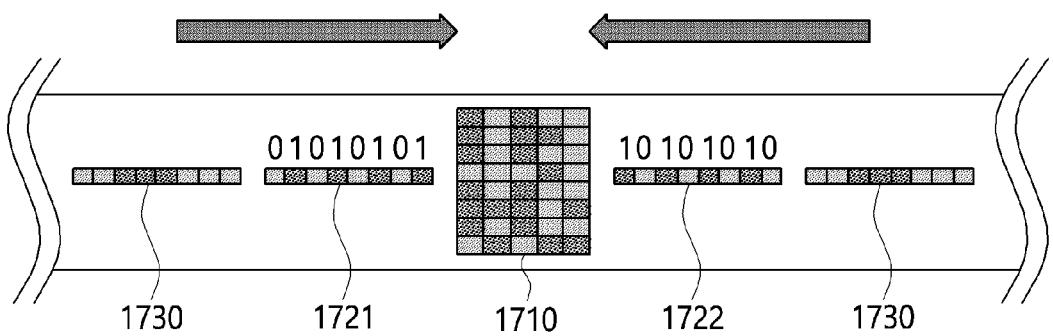
FIG. 15 is a table illustrating a signal for unit information provided to a pattern of magnetic paint according to the present disclosure.
FIG. 16 is a table illustrating an example of a base-6 number system generated through a complex pattern according to the present disclosure.
FIG. 17 is an exemplary view of control of an optical sensor by a magnetic sensing signal according to the present disclosure.

FIG. 15 is a table illustrating a signal for unit information provided to a pattern of magnetic paint.

In the case of a complex pattern, in which the magnetic pattern and the optical pattern are combined, each element of the pattern is able to represent much information, so a large amount of information may be recorded per unit length or unit area.

Also, because a two-dimensional pattern is able to provide an exponentially large amount of information, compared to a one-dimensional pattern, it may provide a greater amount of information than that provided by an existing QR code.

Referring to FIG. 15, there is a great difference between the amount of information that can be generated using a one-dimensional complex pattern having a fixed length (e.g., 2) and having two elements and the amount of information that can be generated using a two-dimensional complex pattern (e.g., 2×2) corresponding to the fixed length.

Here, the one-dimensional complex pattern may provide up to 36 kinds of information using the two elements, but the two-dimensional complex pattern having the same length may provide 1296 kinds of information.

Accordingly, the complex pattern of a two-dimensional array, that is, the combination of a magnetic pattern and an optical pattern, may record an exponentially large amount of information, compared to the complex pattern of a one-dimensional array, and may provide a greater amount of information to an autonomous vehicle or a user.

FIG. 16 is a table illustrating an example of a base-6 number system generated through a complex pattern.

As described above, a magnetic pattern in the form of binary bits may be converted into multiple bits by processing the magnetic pattern using multiple colors according to an embodiment of the present disclosure, whereby a greater amount of information may be provided per unit length or unit area.

In the case of a mobile electronic communication device for which AI is used, the amount of initially input information affects the accuracy and amount of resultant information.

Referring to FIG. 16, the pattern according to an embodiment of the present disclosure may provide a binary signal configured with 0 and 1 through a one-dimensional magnetic pattern configured with an N-pole and an S-pole, and may provide a senary signal configured with 0, 1, 2, 3, 4, and 5 by adding three pieces of color information, including red, green, and blue (RGB), thereto, thereby providing more various kinds of information per unit length or unit area.

For example, the decimal number 128 converted into a binary number is 10000000, which requires a physical space for an 8-digit number. However, the decimal number 128 converted into a quaternary number is 2000, which requires only four digits, and the decimal number 128 converted into a base-6 number is 332, which requires only three digits, so the physical space therefor may be significantly reduced. As a result, a greater amount of information may be recorded per unit length or unit area.

Also, because the pattern according to an embodiment of the present disclosure is read in a forward direction and a reverse direction, rather than being read in only one direction, when a vehicle is driving the wrong way on a road, this may be recognized and information thereabout may be provided to the control module of an autonomous vehicle or a driver.

FIG. 17 is an exemplary view of control of an optical sensor using a magnetic sensing signal according to the present disclosure.

According to an embodiment of the present disclosure, magnetic patterns 1721, 1722, and 1730 and an optical pattern 1710 may be designed to have different functions.

In an embodiment of the present disclosure, magnetic paint or the magnetic patterns 1721, 1722, and 1730 may provide only direction information for indicating the location of the optical pattern 1710, and the optical pattern 1710 found at the corresponding location may provide various kinds of other information, whereby the roles thereof may be divided.

Here, because the optical pattern 1710 may use a large number of colors for respective information units, as described above, it may provide more information than existing methods. An example of such information may include information about buildings at the corresponding location, road information, nearby tourism information, and the like.

Here, when an optical sensor always operates, it may cause a waste of power, and because there is a limit on the capacity of a portable battery, the optical sensor may be made operate only when a specific magnetic pattern 1721 or 1722 is input.

For example, referring to FIG. 17, the magnetic patterns 1721, 1722, and 1730 formed as one-dimensional patterns may provide an autonomous vehicle or a user with the current location and information about the location of the optical pattern 1710.

Here, the optical pattern 1710 is formed in two dimensions, thereby providing various kinds of information, such as detailed information about the corresponding location, nearby tourism information, and the like.

Here, the magnetic patterns 1721 and 1722 near the optical pattern 1710 are formed as arbitrarily set specific patterns (e.g., 01010101), and the driving information recognition apparatus according to an embodiment of the present disclosure may operate the optical sensor when it recognizes the magnetic pattern 1721 or 1722 having the specific pattern.

Also, because it should be possible to operate the optical sensor at the same location even when an autonomous vehicle equipped with the driving information recognition apparatus according to an embodiment of the present disclosure drives in the reverse direction, the magnetic patterns 1721 and 1722, which are adjacent to the optical pattern and symmetrically placed based on the optical pattern 1710, may be formed as patterns that are symmetrical to each other.

In FIG. 17, the shade of each of the patterns 1710, 1721, 1722, and 1730 is illustrated as having two levels, but it is not limited thereto. Also, the magnetic patterns 1721, 1722, and 1730 are illustrated as one-dimensional patterns and the optical pattern 1710 is illustrated as a two-dimensional pattern, but they are not limited thereto.

The above-described driving information recognition apparatus according to an embodiment of the present disclosure includes a magnetic sensor for generating a magnetic sensing signal from magnetic paint applied to road markings, a frequency conversion unit for generating a frequency-converted signal using the magnetic sensing signal, and a control unit for generating driving information for a vehicle using the frequency-converted signal.

Here, the frequency-converted signal may be generated by generating detection signals by detecting the magnetic sensing signal at preset periods, generating average signals by averaging a preset number of detection signals, collecting a number of average signals corresponding to a preset conversion unit or collecting the average signals for a preset time period, and performing frequency conversion thereon.

Here, the magnetic sensing signal may include a first magnetic sub-signal generated from the magnetic paint through a first magnetic sensor and a second magnetic sub-signal generated from the magnetic paint through a second magnetic sensor.

Here, the frequency-converted signal may be generated using a noise-reduced signal generated using the difference between the first magnetic sub-signal and the second magnetic sub-signal.

Here, the noise-reduced signal may be generated using the differences between the average signals corresponding to the first magnetic sub-signal and the average signals corresponding to the second magnetic sub-signal.

Here, the driving information recognition apparatus may further include a vibration sensor that is configured to detect a vibration frequency while the magnetic sensing signal is being generated.

Here, the frequency-converted signal may be generated using an additional noise-reduced signal acquired by further removing noise corresponding to the vibration frequency from the noise-reduced signal.

Here, the control unit may generate direction information of the magnetic paint using the difference between the time at which the first magnetic sub-signal is received and the time at which the second magnetic sub-signal is received.

Here, the driving information recognition apparatus may further include an optical sensor for generating optical sensing information from the magnetic paint, and the control unit may generate driving information using any one or more of the frequency-converted signal, or the optical sensing signal, or a combination thereof.

Here, the magnetic sensing signal may correspond to a one-dimensional magnetic pattern or a two-dimensional magnetic pattern.

Here, the optical sensing signal is configured to subdivide the magnetic pattern corresponding to the magnetic sensing signal, thereby increasing the amount of information per unit length or unit area, compared to when only the magnetic sensing signal is used.

Figure 37:
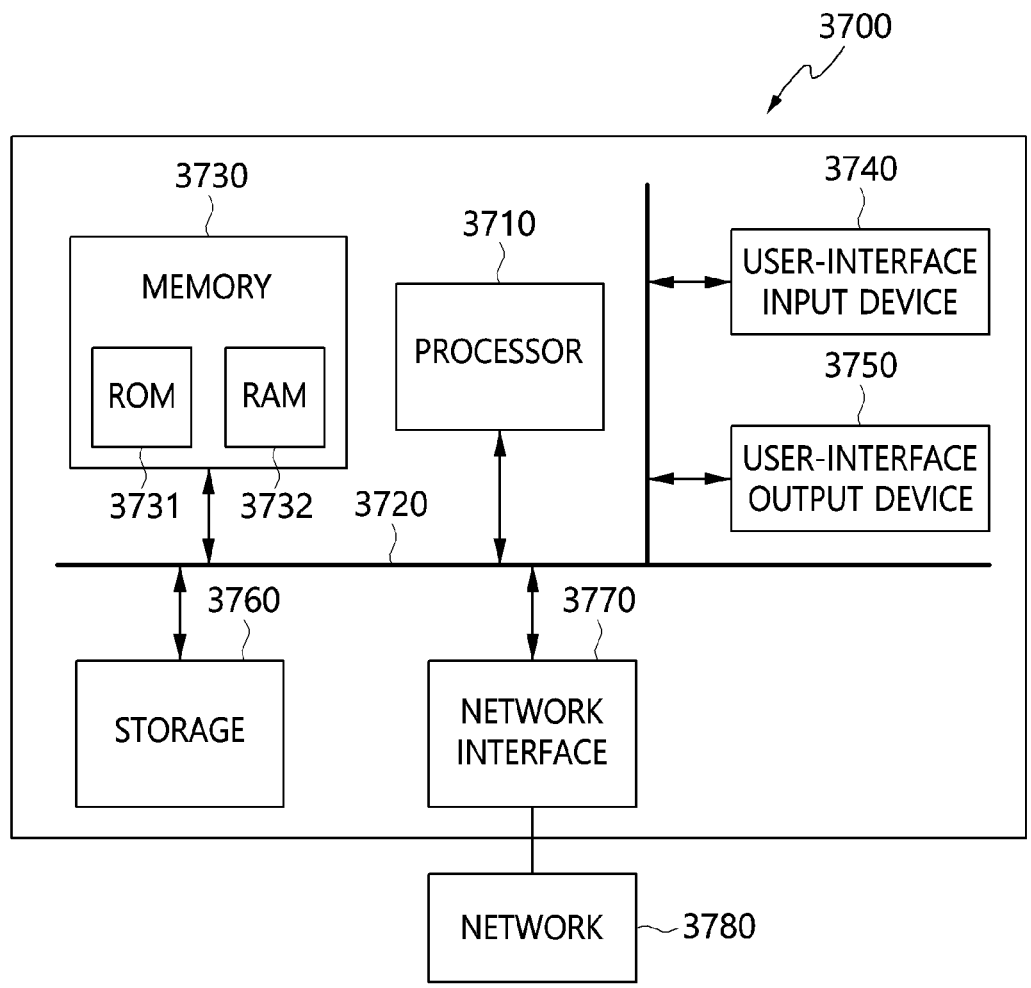
FIG. 37 is a view illustrating a computer system according to an embodiment of the present disclosure.

Here, the control unit may correspond to the processor 3700 of the computer system illustrated in FIG. 37, the magnetic sensor, the vibration sensor, and the optical sensor may communicate with the processor 3700 via a bus 3720, and the generated magnetic sensing signal, the vibration frequency, and the optical sensing signal may be stored in memory 3730 or storage 3760.

Figure 18:
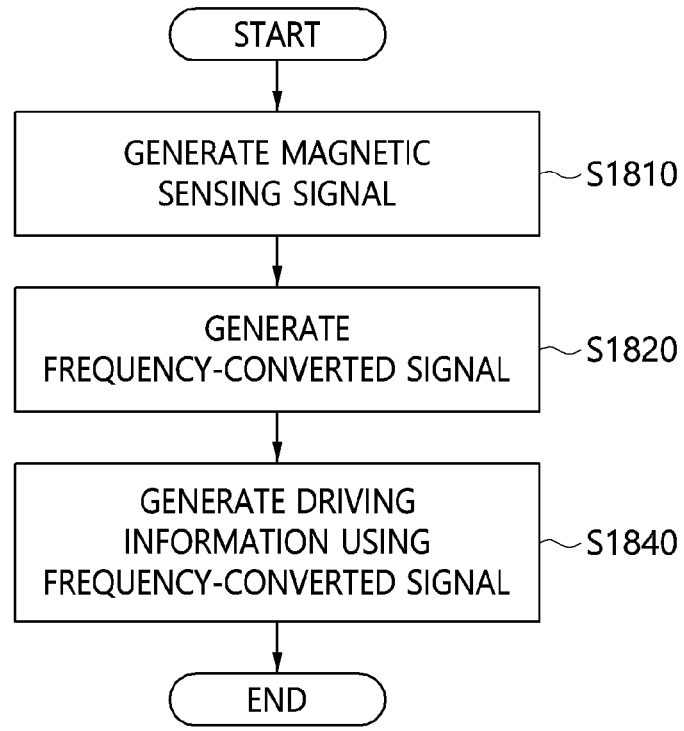
FIG. 18 is a flowchart illustrating a method for recognizing driving information using multiple magnetic sensors according to an embodiment of the present disclosure.

FIG. 18 is a flowchart illustrating a method for recognizing driving information according to an embodiment of the present disclosure.

Referring to FIG. 18, in the method for recognizing driving information according to an embodiment of the present disclosure, a magnetic sensing signal is generated from magnetic paint applied to road markings at step S1810.

Here, the magnetic sensing signal may include a first magnetic sub-signal generated from the magnetic paint through a first magnetic sensor and a second magnetic sub-signal generated from the magnetic paint through a second magnetic sensor.

Also, in the method for recognizing driving information according to an embodiment of the present disclosure, a frequency-converted signal is generated using the magnetic sensing signal at step S1820.

Here, frequency-converted signal may be generated by generating detection signals by detecting the magnetic sensing signal at preset periods, generating average signals by averaging a preset number of detection signals, collecting a number of average signals corresponding to a preset conversion unit or collecting the average signals for a preset time period, and performing frequency conversion thereon.

Here, the frequency-converted signal may be generated using a noise-reduced signal generated using the difference between the first magnetic sub-signal and the second magnetic sub-signal.

Here, the noise-reduced signal may be generated using the differences between the average signals corresponding to the first magnetic sub-signal and the average signals corresponding to the second magnetic sub-signal.

Also, although not illustrated in FIG. 18, in the method for recognizing driving information according to an embodiment of the present disclosure, a vibration frequency is detected based on a vibration sensor installed in the vehicle while the magnetic sensing signal is being generated.

Here, the frequency-converted signal may be generated using an additional noise-reduced signal acquired by further removing noise corresponding to the vibration frequency from the noise-reduced signal.

Also, in the method for recognizing driving information according to an embodiment of the present disclosure, driving information for the vehicle is generated using the frequency-converted signal at step S1830.

Also, although not illustrated in FIG. 18, in the method for recognizing driving information according to an embodiment of the present disclosure, direction information of the magnetic paint is generated using the difference between the time at which the first magnetic sub-signal is received and the time at which the second magnetic sub-signal is received.

Also, although not illustrated in FIG. 18, in the method for recognizing driving information according to an embodiment of the present disclosure, an optical sensing signal is generated from the magnetic paint.

Here, driving information may be generated using any one or more of the frequency-converted signal, or the optical sensing signal, or a combination thereof.

Here, the magnetic sensing signal may correspond to a one-dimensional magnetic pattern or a two-dimensional magnetic pattern.

Here, the optical sensing signal is configured to subdivide the magnetic pattern corresponding to the magnetic sensing signal, thereby increasing the amount of information per unit length or unit area, compared to when only the magnetic sensing signal is used.

Through the above-described method for recognizing driving information, a magnetic signal may be accurately detected from magnetic paint applied to road markings by using multiple magnetic sensors.

Also, when a magnetic signal sensitive to noise is detected, noise may be efficiently removed based on signals sensed using multiple magnetic sensors.

Also, noise is further removed using a vibration frequency detected using a vibration sensor, whereby a problem that is caused when a signal is detected using only a magnetic sensor may be solved and a Signal-to-Noise Ratio (SNR) may be improved.

Also, a pattern by a magnetic signal or an optical signal is efficiently recognized from magnetic paint applied to road markings, whereby driving information may be provided to the control module of an autonomous vehicle and a driver.

Also, driving information is generated by combining a magnetic sensing signal with an optical sensing signal, whereby a lot of various information may be provided to an autonomous vehicle and a driver, compared to when only the magnetic sensing signal is used.

Also, according to an embodiment of the present disclosure, magnetic information or optical information is recorded as a one-dimensional or two-dimensional pattern by applying magnetic paint or multiple colors of paint to commonly-used sidewalk blocks having no tactile textures, instead of using tactile textured sidewalk blocks for the visually impaired, and the information is read using a magnetic sensor or an optical sensor, whereby pedestrian guidance may be provided not only to visually impaired people but also to normal people.

Also, according to an embodiment of the present disclosure, both a one-dimensional pattern and a two-dimensional pattern are applied to sidewalk blocks, and magnetic information and optical information of each of the patterns may be detected and used to complement each other, whereby the effect of significantly reducing malfunction of the sensors for sensing the respective pieces of information may be provided.

Here, the pedestrian guidance that is provided may be information related to the location of the pattern and a movement direction and various kinds of information that a user who constructs the pattern intends to convey.

Accordingly, in an embodiment of the present disclosure, a magnetic field detection element for recognizing the above-mentioned information and an optical detection element (a color detection element) for identifying color may be used in combination with each other, and further information may be conveyed to pedestrians in a tactile, auditory, or visual manner by interworking with a user terminal such as a mobile electronic communication device.

The above-described embodiment may be practiced by applying paint having magnetic information and optical information to the ground, or the like, without being limited to sidewalk blocks, and may also be applied to a mobile object that is moving using the information and a system for operating the same.

Also, an embodiment of the present disclosure includes one or more magnetic sensors for recognizing the magnetic pattern, thereby generating a noise-reduced signal using the difference between signals input to the respective magnetic sensors and detecting magnetic information using the noise-reduced signal.

Hereinafter, a preferred embodiment of the present disclosure will be described in detail with reference to the accompanying drawings.

Figure 19:
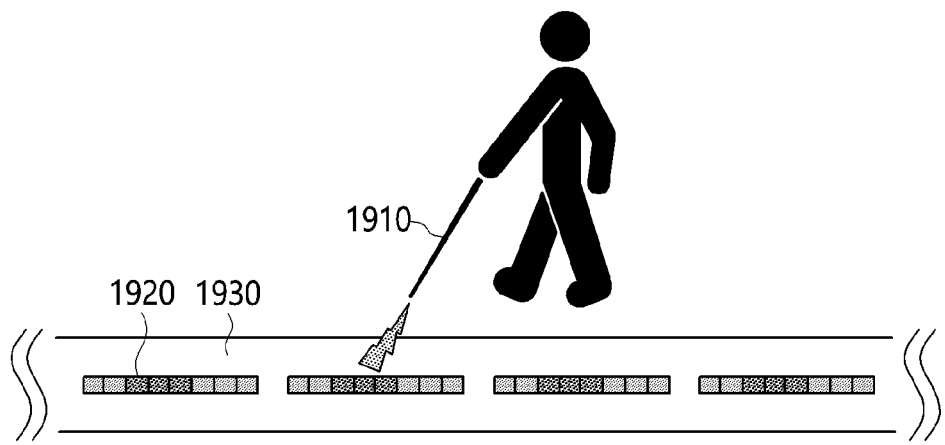
FIG. 19 is view illustrating a use case of an apparatus for recognizing pedestrian guidance according to an embodiment of the present disclosure.

FIG. 19 is a use-case view of an apparatus for recognizing pedestrian guidance according to an embodiment of the present disclosure.

Referring to FIG. 19, a pedestrian guidance recognition apparatus 1910 according to an embodiment of the present disclosure is made in the form of a stick such that a user (a pedestrian or the like) is able to carry the same when walking, and may be configured to recognize information stored in magnetic paint 1920 applied to the ground 1930.

Here, the magnetic paint 1920 may form a specific pattern using magnetic properties, and may alternatively form a specific pattern using optical properties that differ in color.

Here, the pedestrian guidance recognition apparatus 1910 according to an embodiment of the present disclosure may read a specific pattern of the magnetic paint 1920 applied to the ground, recognize pedestrian guidance included in the specific pattern, and provide the same to a user.

Here, the pedestrian guidance may include all kinds of information required for walking, such as a location, nearby buildings, tourist spot information, a sidewalk range, and the like.

Figure 20:
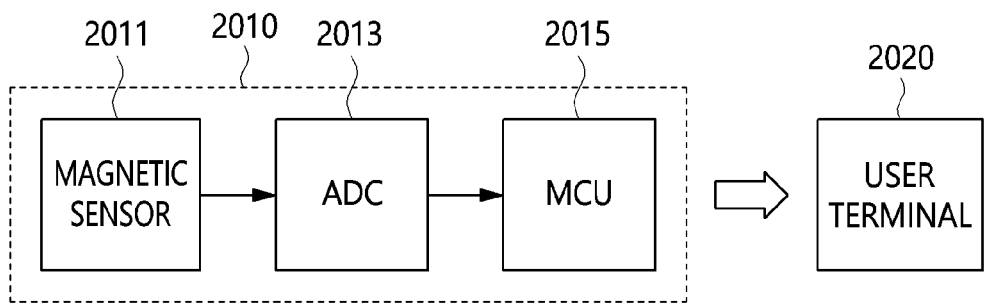
FIG. 20 is a block diagram illustrating an apparatus for recognizing pedestrian guidance according to an embodiment of the present disclosure.

FIG. 20 is a block diagram of an apparatus for recognizing pedestrian guidance according to an embodiment of the present disclosure.

Referring to FIG. 20, the pedestrian guidance recognition apparatus 2010 according to an embodiment of the present disclosure may include a magnetic sensor 2011, an Analog-Digital Converter (ADC) 2013, a processor (e.g., an MCU, a MICOM, or the like) 2015, and the like.

Here, the pedestrian guidance recognition apparatus 2010 according to an embodiment of the present disclosure may generate pedestrian guidance from magnetic paint applied to the ground, and may provide the pedestrian guidance to a user terminal 2020 through wired or wireless communication.

Here, the magnetic sensor 2011 may detect a magnetic signal from the magnetic paint applied to the ground.

Here, because the magnetic signal may be an analog signal, it may be converted into a digital signal through the analog-digital converter 2013, as will be described later.

Here, the magnetic sensor 2011 may also detect a noise signal due to the earth's magnetic field or an environment in which a magnetic field is generated or induced from nearby iron, or the like. Accordingly, the magnetic sensor may use a magnetic sensor that detects a dynamic signal rather than a static signal.

The magnetic sensor for detecting a dynamic signal is not able to detect a signal when it remains stationary over the magnetic paint in which magnetic information is recorded, and is able to detect a signal only when it is moving. That is, a sensor capable of detecting a change in a magnetic signal over time may be used.

Here, the analog-digital converter 2013 may convert the analog signal detected using the magnetic sensor 2011 into a digital signal such that the processor 2015 processes the signal.

Here, the analog-digital converter 2013 may be an ADC having the resolution of 12 bits or higher and a sampling rate equal to or greater than 1 kS/s.

Here, the processor 2015 may generate pedestrian guidance by processing the digital signal acquired through the analog-digital converter 2013.

More specifically, the processor 2015 performs Fast Fourier Transform (FFT) on the digital signal, thereby extracting a period of the pattern recorded in the magnetic paint, that is, a frequency.

Here, the processor 2015 may generate the pedestrian guidance based on the frequency and transfer the same to the user terminal 2020, and it is desirable to transfer the pedestrian guidance analyzed through fast Fourier transform to the user terminal 2020 within one second from the time of signal detection.

Here, a communication method for transferring the pedestrian guidance may be a short-range wireless communication method, such as Wi-Fi, near-field communication (NFC), Bluetooth, or the like, or a wired communication method.

Here, the pedestrian guidance may be provided to a user after being converted into a tactile (e.g., vibration) or auditory (e.g., sound) signal through the user terminal 2020, and may be visually provided through the display of the user terminal 2020.

The reason for varying the provision method as described above is for increasing the transfer efficiency and the amount of information provided to the user within the same amount of time.

Figure 21:
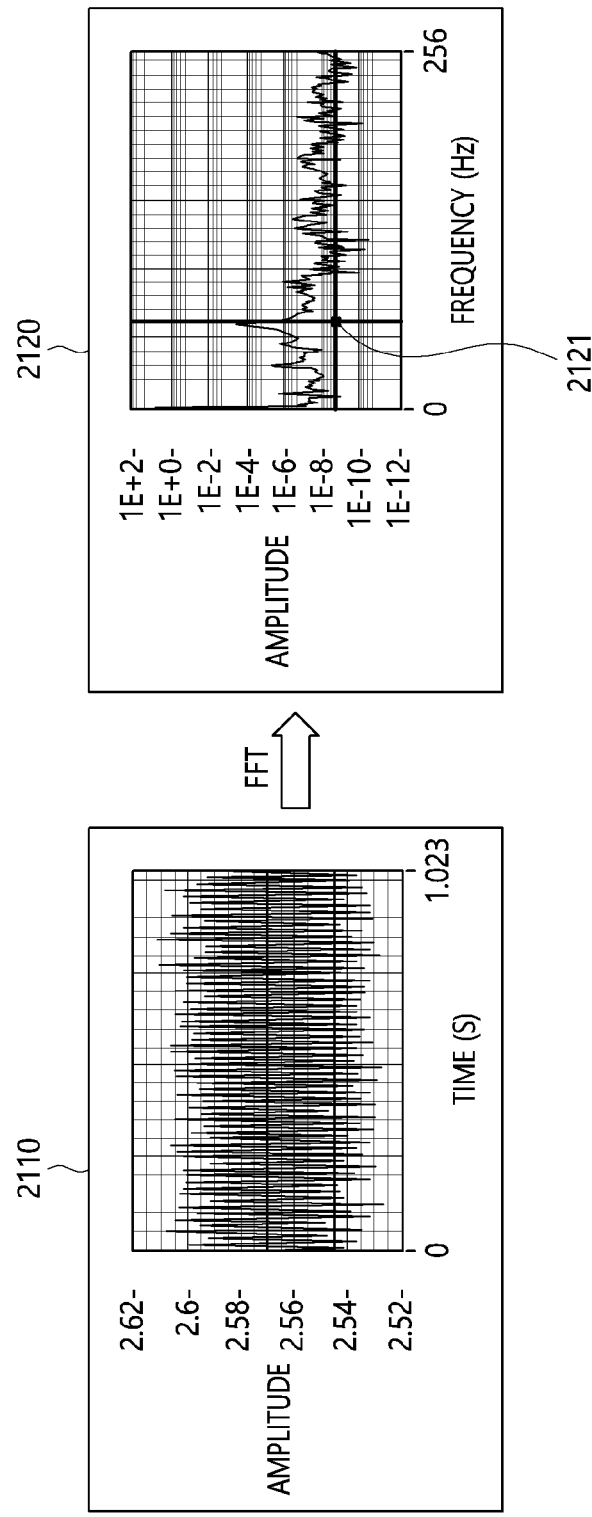
FIG. 21 is a graph illustrating a process of generating a frequency-converted signal according to an embodiment of the present disclosure.

FIG. 21 is a graph illustrating a process of generating a frequency-converted signal according to an embodiment of the present disclosure.

Referring to FIG. 21, the left graph 2110 is a graph of an alternating magnetic pattern that is measured by reading the same into Field-Programmable Gate Arrays (FPGAs) using a magnetic sensor after the alternating magnetic paint corresponding to 60 Hz is constructed.

Here, the left graph 2110 is a graph illustrating 1024 signals collected for 1.024 seconds when the average of 200 detection signals, which are generated by detecting a signal acquired from a single analog magnetic sensor through FPGAs every five microseconds (μs), is taken as a single signal.

Here, the span between the minimum strength and the maximum strength (amplitude) in the left graph 2110 may vary within a signal range of about 100 mV (from about 2.52 V to 2.62 V).

The right graph 2120 illustrated in FIG. 21 is a graph of the result of fast Fourier transform performed on the 1024 signals, and it can be seen that, after the alternating magnetic pattern is drawn so as to correspond to 60 Hz, when the signal detected through the magnetic sensor is converted, the signal of 60 Hz (2121) is clearly differentiated from other signals, whereby pedestrian guidance and the like may be provided using the magnetic pattern signal. That is, because a magnetic signal has characteristics in which it is very sensitive to noise and in which the measurement value thereof fluctuates depending on various kinds of noise, if the magnetic signal is not efficiently measured, it is difficult to acquire desired pedestrian guidance from the magnetic signal measured from the applied magnetic paint. Therefore, by collecting a sufficient number of detection signals, calculating the average thereof, collecting the calculated average values, and performing frequency conversion thereon, a desired frequency pattern may be detected from the magnetic paint applied to the ground.

However, when a magnetic signal is detected using a single magnetic sensor, there may be a lack of means for reducing noise. Therefore, noise is reduced using multiple magnetic sensors, as will be described later, whereby a frequency corresponding to the alternating magnetic pattern may be more clearly detected.

Figure 22:
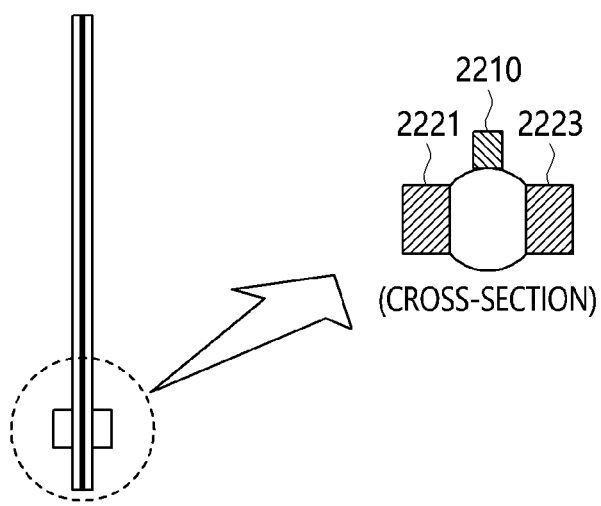
FIGS. 22 to 23 are structural diagrams illustrating a pedestrian guidance recognition apparatus including multiple magnetic sensors according to an embodiment of the present disclosure.
Figure 23:
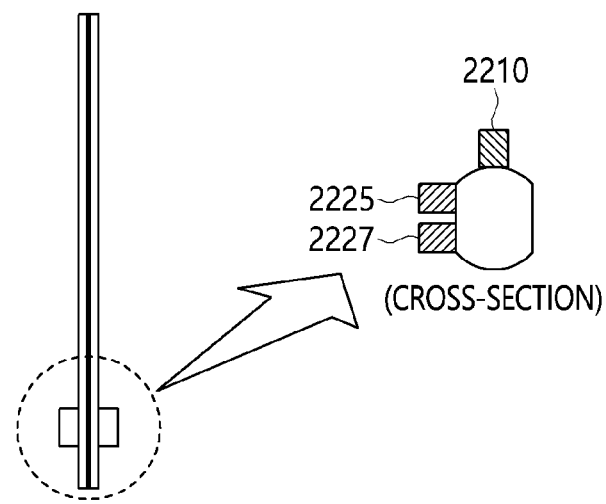

FIGS. 22 to 23 are structural diagrams of a pedestrian guidance recognition apparatus including multiple magnetic sensors according to an embodiment of the present disclosure.

First, referring to FIG. 22, the pedestrian guidance recognition apparatus 1910 according to an embodiment of the present disclosure is made in the form of a stick such that a user (a pedestrian or the like) is able to carry the same when walking, and may include two magnetic sensors 2221 and 2223 capable of detecting magnetic signals on the left and right sides of the stick and a center marker 2210 through which the center of the stick can be identified.

Here, the first magnetic sensor 2221 for detecting a magnetic signal on the left side of the stick based on the center marker 2210 and the second magnetic sensor 2223 for detecting a magnetic signal on the right side of the stick based on the center marker 2210 may be located in the stick so as to be spaced apart from each other.

Meanwhile, referring to FIG. 23, the pedestrian guidance recognition apparatus 1910 according to an embodiment of the present disclosure is configured such that two magnetic sensors 2225 and 2227 capable of detecting a magnetic signal are integrated on one side of the stick, and may include a center marker 2210 through which the center of the stick can be identified.

Here, the pedestrian guidance recognition apparatus 1910 including two magnetic sensors 2221 and 2223 or 2225 and 2227 according to an embodiment of the present disclosure may reduce noise using a time difference between magnetic signals detected by the respective magnetic sensors, as will be described later. Also, noise may be reduced by subtracting the magnetic signals detected by the respective magnetic sensors from each other.

Figure 24:
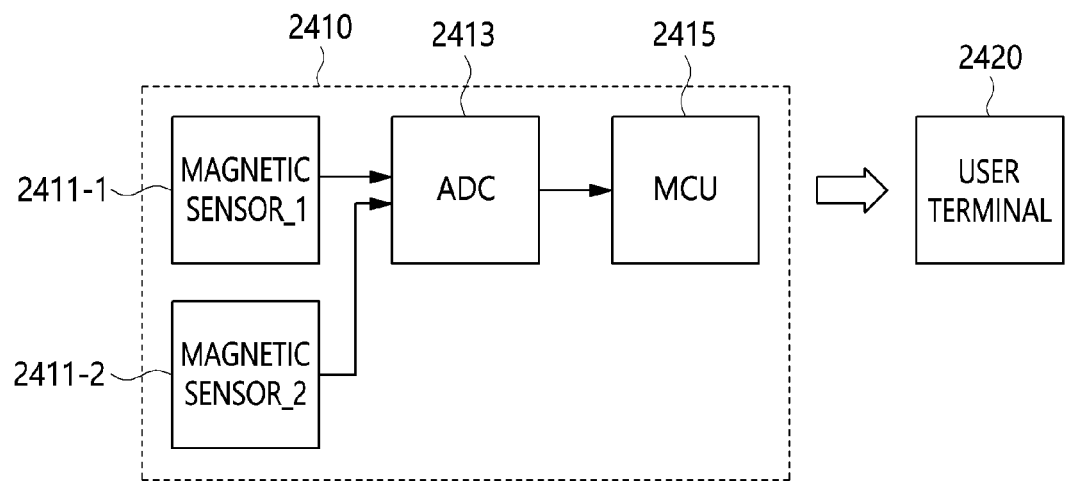
FIG. 24 is a block diagram illustrating a pedestrian guidance recognition apparatus including multiple magnetic sensors according to an embodiment of the present disclosure.

FIG. 24 is a block diagram of a pedestrian guidance recognition apparatus including multiple magnetic sensors according to an embodiment of the present disclosure.

Referring to FIG. 24, the pedestrian guidance recognition apparatus 2410 according to an embodiment of the present disclosure may include a first magnetic sensor 2411-1, a second magnetic sensor 2411-2, an Analog-Digital Converter (ADC) 2413, a processor (e.g., an MCU, a MICOM, or the like) 2415, and the like.

Here, the pedestrian guidance recognition apparatus 2410 according to an embodiment of the present disclosure may generate pedestrian guidance from magnetic paint applied to the ground, as in the embodiment including a single magnetic sensor, and may provide the pedestrian guidance to a user terminal 2420 through wired or wireless communication.

Here, the first magnetic sensor 2411-1 and the second magnetic sensor 2411-2 may detect a magnetic signal from the magnetic paint applied to the ground, in which case they may detect the same magnetic signal from the same magnetic paint at different times.

Here, because the magnetic signal may be an analog signal, it may be converted into a digital signal through the analog-digital converter, as will be described later.

Here, the magnetic sensors 2411-1 and 2411-2 may also detect a noise signal generated due to the earth's magnetic field or an environment in which a magnetic field is generated or induced from nearby iron, or the like. Therefore, the magnetic sensor may use a magnetic sensor that detects a dynamic signal rather than a static signal.

The magnetic sensor for detecting a dynamic signal is not able to detect a signal when it remains stationary over the magnetic paint in which magnetic information is recorded, and is able to detect a signal only when it is moving. That is, a sensor capable of detecting a change in a magnetic signal over time may be used.

Here, the analog-digital converter 2413 may convert the analog magnetic signal detected using the first magnetic sensor 2411-1 and the second magnetic sensor 2411-2 into a digital signal such that the processor 2415 processes the same.

Here, the analog magnetic signal detected using the first magnetic sensor 2411-1 and the second magnetic sensor 2411-2 may be the difference between the respective analog magnetic signals detected using the first magnetic sensor 2411-1 and the second magnetic sensor 2411-2, and it will be described in more detail later with reference to FIG. 25.

Here, the analog-digital converter 2413 may be an ADC having the resolution of 12 bits or higher and a sampling rate equal to or greater than 1 kS/s.

Here, the processor 2415 may generate pedestrian guidance by processing the digital signal acquired through the analog-digital converter 2413.

More specifically, the processor 2415 performs Fast Fourier Transform (FFT) on the digital signal, thereby extracting a period of the pattern recorded in the magnetic paint, that is, a frequency.

Here, the processor 2415 may generate the pedestrian guidance based on the frequency and transfer the same to the user terminal 2420, and it is desirable to transfer the pedestrian guidance analyzed through fast Fourier transform to the user terminal 2420 within one second from the time of signal detection.

Here, a communication method for transferring the pedestrian guidance may be a short-range wireless communication method, such as Wi-Fi, near-field communication (NFC), Bluetooth, or the like, or a wired communication method.

Here, the pedestrian guidance may be provided to a user after being converted into a tactile (e.g., vibration) or auditory (e.g., sound) signal through the user terminal 520, and may be visually provided through the display of the user terminal 2420.

The reason for varying the provision method, as described above, is for increasing the transfer efficiency and the amount of information provided to the user within the same amount of time.

Figure 25:
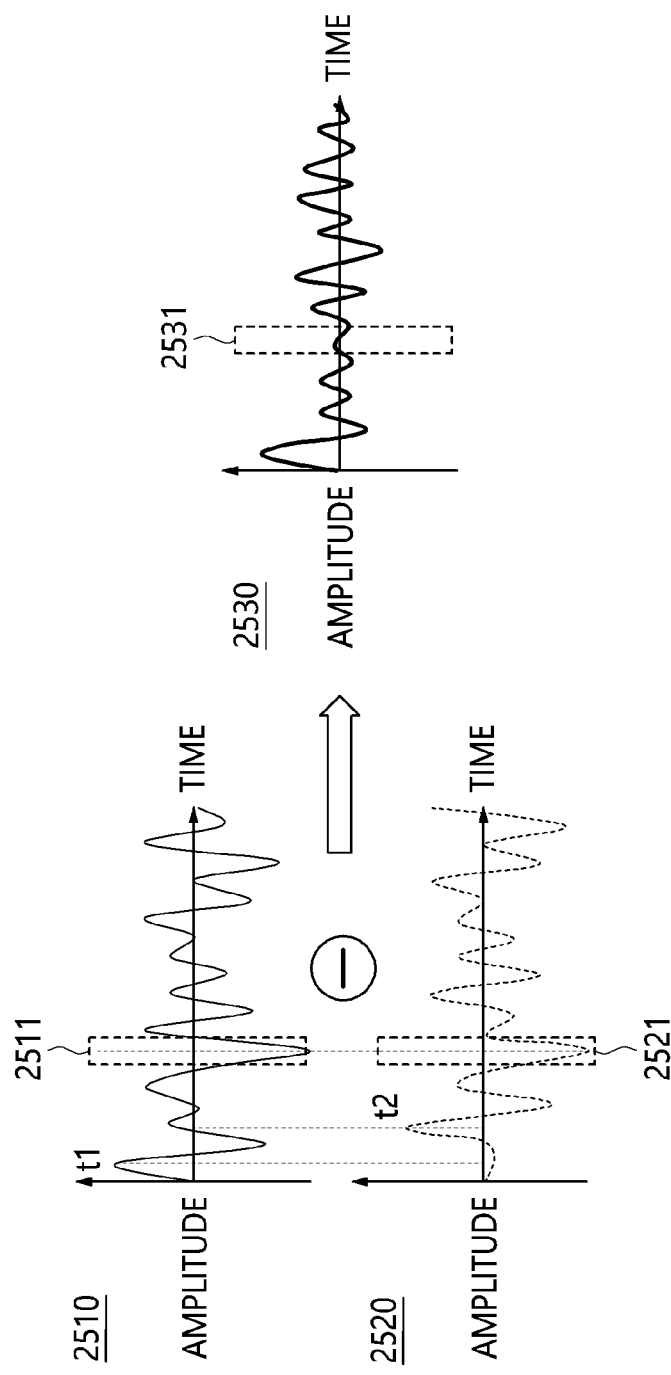
FIG. 25 is a graph illustrating a process of generating a noise-reduced signal according to an embodiment of the present disclosure.

FIG. 25 is a graph illustrating a process of generating a noise-reduced signal according to an embodiment of the present disclosure.

Referring to FIG. 25, the pedestrian guidance recognition apparatus including two magnetic sensors according to an embodiment of the present disclosure may detect the same magnetic signal at different times.

For example, when the source of the magnetic signal is closer to a first magnetic sensor than a second magnetic sensor, a first magnetic sub-signal 2510 may be detected through the first magnetic sensor t2-t1 earlier than a second magnetic sub-signal 2520 that is detected through the second magnetic sensor.

However, a noise signal 2511 detected by the first magnetic sensor and a noise signal 2521 detected by the second magnetic sensor are input in the same time window without a time difference.

Accordingly, a noise-reduced signal 2530 from which the noise signal 2531 is removed may be generated by calculating the difference between the first magnetic sub-signal 2510 and the second magnetic sub-signal 2520, whereby the frequency recorded in the magnetic paint may be more clearly extracted.

Here, the noise-reduced signal 2530 may alternatively be the differences between average signals corresponding to the first magnetic sub-signal 2510 and average signals corresponding to the second magnetic sub-signal 2520.

Also, the pedestrian guidance recognition apparatus according to an embodiment of the present disclosure may be configured such that two magnetic sensors 225 and 227 for respectively detecting magnetic fields in different directions are integrated, as illustrated in FIG. 23.

More specifically, any one of the two magnetic sensors (2225 or 2227) may be installed in the pedestrian guidance recognition apparatus 1910 in the direction in which a magnetic field in the vertical direction can be detected, and the other magnetic sensor 2227 or 2225 may be installed in the pedestrian guidance recognition apparatus 1910 in the direction in which a magnetic field in the horizontal direction can be detected.

Here, when the strength of the magnetic field in the vertical direction, coming from the paint with which a magnetic pattern is built, is largest, a magnetic signal in the horizontal direction has a relatively small strength.

Here, the pedestrian guidance recognition apparatus according to an embodiment of the present disclosure may integrate the first and second magnetic sensors therein such that the first magnetic sensor 2225 detects a first magnetic sub-signal corresponding to a vertical magnetic field and such that the second magnetic sensor 2227 detects a second magnetic sub-signal corresponding to a horizontal magnetic field.

Here, the pedestrian guidance recognition apparatus according to an embodiment of the present disclosure may reduce a noise signal generated in the vicinity thereof by applying the two signals to the above-described method, thereby more clearly reading a signal intended to be detected from the paint.

Meanwhile, this method may also be the above-mentioned method of using the time difference in detection by the two sensors.

Figure 26:
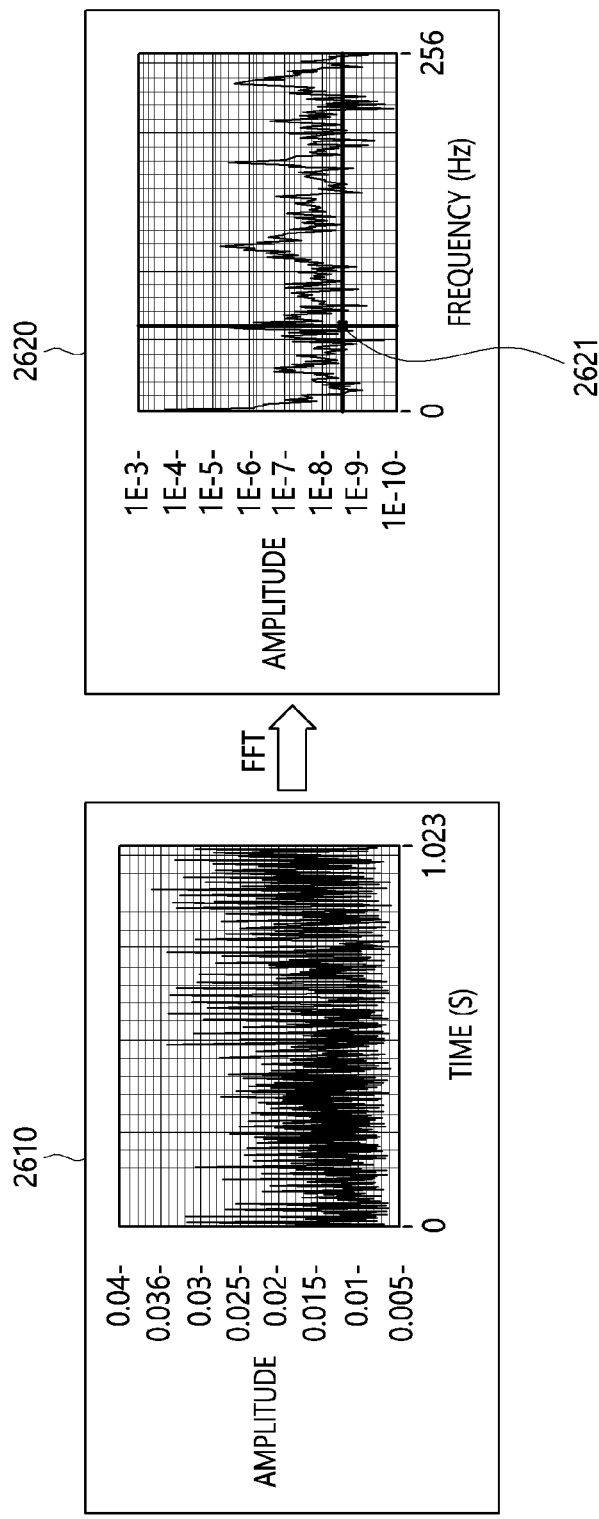
FIG. 26 is a graph illustrating a process of generating a frequency-converted signal using a noise-reduced signal according to an embodiment of the present disclosure.

FIG. 26 is a graph illustrating a process of generating a frequency-converted signal using a noise-reduced signal according to an embodiment of the present disclosure.

Referring to FIG. 26, the left graph 2610 is a graph illustrating a noise-reduced signal, which is the difference between a first magnetic sub-signal and a second magnetic sub-signal detected using a first magnetic sensor and a second magnetic sensor after an alternating magnetic pattern corresponding to 60 Hz is constructed, as in FIG. 21.

As described above, when two magnetic sensors are used, noise may be reduced and the frequency recorded in magnetic paint may be more clearly extracted.

Here, the left graph 2610 may be a graph illustrating 1024 signals collected for 1.024 seconds when the average of 200 detection signals, which are generated by detecting the difference between the first magnetic sub-signal and the second magnetic sub-signal through FPGAs every 5 µs, is taken as a single signal.

Alternatively, the left graph 2610 may be a graph illustrating 1024 signals acquired by collecting the difference between respective averages, each being the average of 200 detection signals generated by detecting each of the first magnetic sub-signal and the second magnetic sub-signal through FPGAs every 5 µs, for 1.024 seconds.

Here, the span between the minimum strength and the maximum strength (amplitude) in the left graph 2610 may vary within a signal range of about 35 mV (from 0.005 V to 0.04 V), and may be about three times less than the amplitude (2.62 V−2.52 V=100 mV) in the case in which detection is performed using a single magnetic sensor.

Also, the right graph 2620 illustrated in FIG. 26 is a graph of a result of fast Fourier transform performed on the 1024 signals and is the case in which the alternating magnetic pattern drawn to correspond to 60 Hz is detected, and it can be seen that the magnetic pattern of 60 Hz (2621) may be clearly identified because harmonics of 60 Hz, such as 60 Hz, 120 Hz, 180 Hz, and the like, appear well as the result of conversion of the noise-reduced signal.

Figure 27:
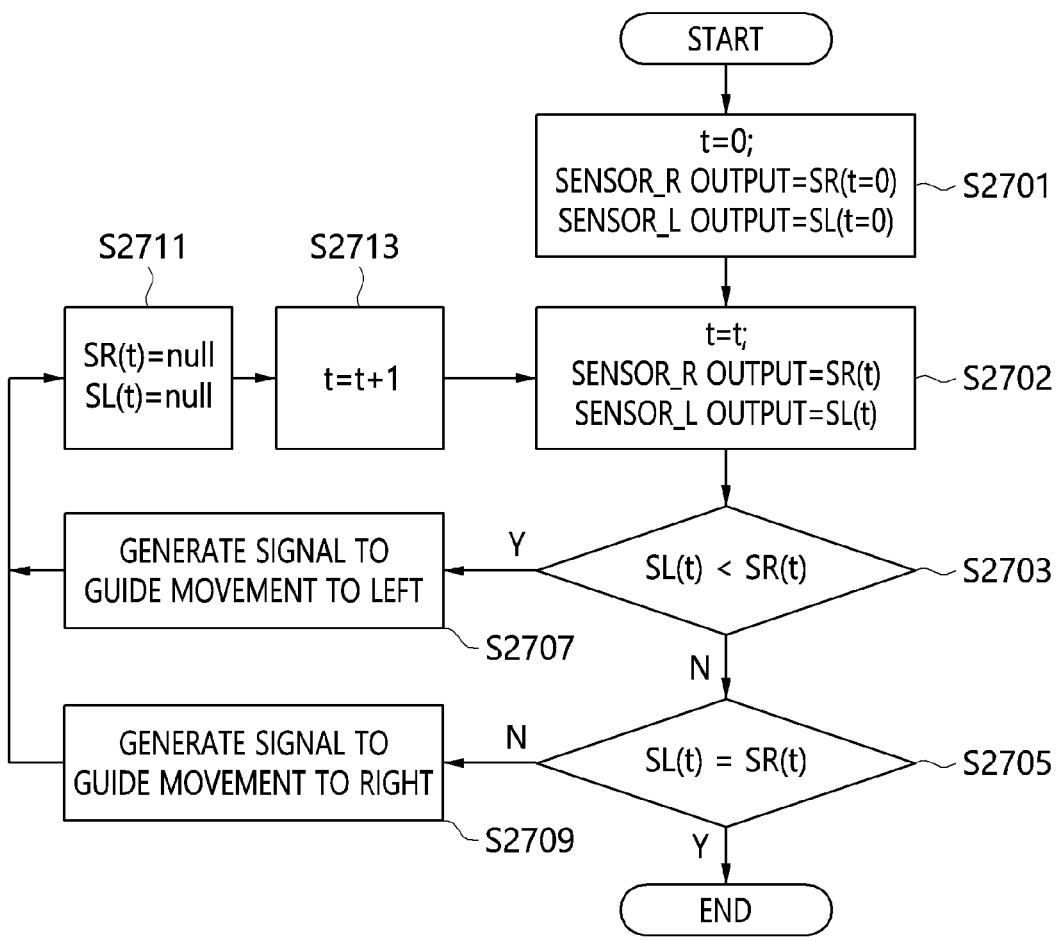
FIG. 27 is a flowchart illustrating a process of generating a pedestrian guidance signal according to an embodiment of the present disclosure.

FIG. 27 is a flowchart of generation of a pedestrian guidance signal according to an embodiment of the present disclosure.

According to an embodiment of the present disclosure, two magnetic sensors are installed at different locations in a pedestrian guidance recognition apparatus, and one or more kinds of magnetic paint applied to the ground may be identified using relative signals detected by the two sensors.

Also, in an embodiment of the present disclosure, one or more lines are drawn with magnetic paint on the ground, whereby a user or a moving object, such as a wheelchair or the like, may be guided to the center between the lines.

Here, in the method of generating a guidance signal according to an embodiment of the present disclosure, first, 0 is substituted into the variable 't', and the output of a first magnetic sensor located on the right side of the pedestrian guidance recognition apparatus according to an embodiment of the present disclosure and the output of a second magnetic sensor located on the left side thereof may be respectively defined as and initialized to SR(t=0) and SL(t=0) at step S2701.

Here, the variable 't' may correspond to time, and SR(t) and SL(t) may correspond to the outputs of the respective magnetic sensors, which change over time.

Also, in the method of generating a guidance signal according to an embodiment of the present disclosure, as times changes, SR(t) and SL(t) are defined to correspond to the time at step S2702, and SR(t) and SL(t) may be compared with each other at step S2703.

Here, in the method of generating a guidance signal according to an embodiment of the present disclosure, when SR(t) is greater than SL(t), a signal may be generated to guide movement to the left at step S2707, whereas when SR(t) is not greater than SL(t), whether SR(t) and SL(t) are equal to each other may be checked at step S2705.

Here, in the method of generating a guidance signal according to an embodiment of the present disclosure, when SL(t) is equal to SR(t), the above steps are repeated by going back to the start, whereas when SL(t) is not equal to SR(t), a signal may be generated to guide movement to the right at step S2709.

Here, in the method of generating a guidance signal according to an embodiment of the present disclosure, after a signal is generated to guide movement to the left or right, null is substituted into each of SR(t) and SL(t) at step S811, t+1 is substituted into the variable 't', and the process may be performed again from step S2702 in order to again determine the current location of a user.

Accordingly, the method of generating a guidance signal according to an embodiment of the present disclosure may guide a user or a moving object to walk or move in the center between the lines by repeatedly performing the above-described steps.

Also, although not illustrated in FIG. 27, only a single line is drawn with magnetic paint on the ground according to another embodiment, whereby a user or a moving object, such as a wheelchair or the like, may be guided to move along the line.

For example, SR(t) and SL(t) may be defined to correspond to time and compared with each other in the same manner as described in FIG. 27, and SR(t) and SL(t) may sense signals generated from magnetic paint with which the single line is drawn.

Here, when SR(t) is greater than SL(t), a user or a moving object, such as a wheelchair or the like, is recognized as leaning to the left side based on the drawn line, and a signal may be generated to guide the user or the moving object to move to the right. Conversely, when SR(t) is less than SL(t), the user or the moving object, such as a wheel chair or the like, is recognized as leaning to the right side based on the drawn line, and a signal may be generated to guide the user or the moving object to move to the left.

Here, when SL(t) is equal to SR(t), the process is repeatedly performed from the start, and when SL(t) is not equal to SR(t), SL(t) and SR(t) are compared with each other, whereby the user or the moving object, such as a wheelchair or the like, may be guided to move along a single line drawn with magnetic paint.

Figure 28:
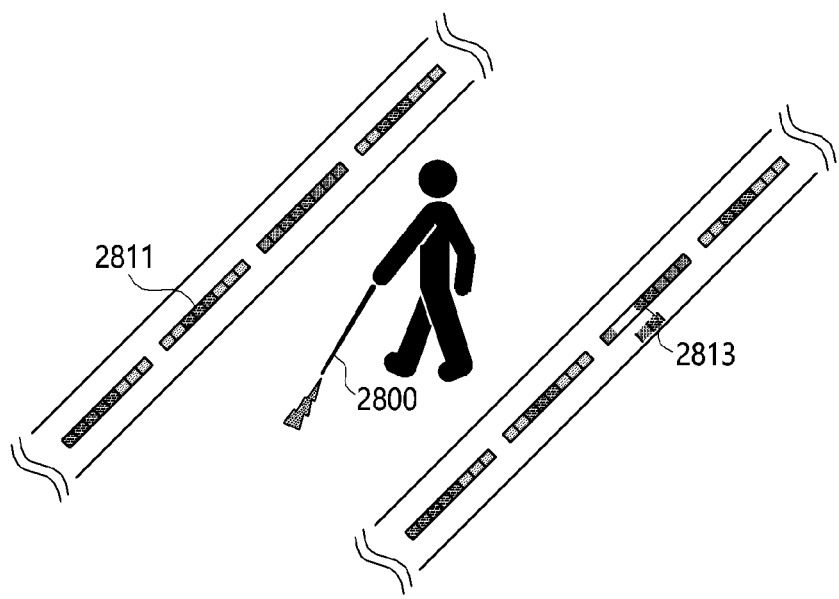
FIG. 28 is a use-case view of application of multiple magnetic patterns according to an embodiment of the present disclosure.

FIG. 28 is a use-case view of application of multiple magnetic patterns according to an embodiment of the present disclosure.

Referring to FIG. 28, two or more magnetic patterns 2811 and 2813 according to an embodiment of the present disclosure may be applied on both sides of a sidewalk.

Here, the first magnetic pattern 2811 and the second magnetic pattern 2813 applied on both sides of the sidewalk are formed as the same pattern based on one direction, whereby a user carrying a pedestrian guidance recognition apparatus 2800 according to an embodiment of the present disclosure may be provided with the same magnetic sensing information.

Alternatively, based on keeping to the right, the first magnetic pattern 2811 located on the right side of a pedestrian is formed as a forward magnetic pattern, and the second magnetic pattern 2813 located on the left side of the pedestrian is formed as a reverse pattern of the first magnetic pattern 2811, whereby constant pedestrian guidance is provided regardless of the direction in which the pedestrian is moving or different magnetic patterns may be formed to include different pieces of information depending on the movement direction.

Here, the location of the user carrying the pedestrian guidance recognition apparatus 2800 according to an embodiment of the present disclosure may be detected using the strengths of magnetic fields by the first magnetic pattern 2811 and the second magnetic pattern 2813, and this will be described in detail later with reference to FIG. 29.

Also, the above-described magnetic patterns 2811 and 2813 may be formed on both sides of a passage, thereby serving as the lines of a lane in which vehicles, wheelchairs, and the like are capable of moving.

Figure 29:
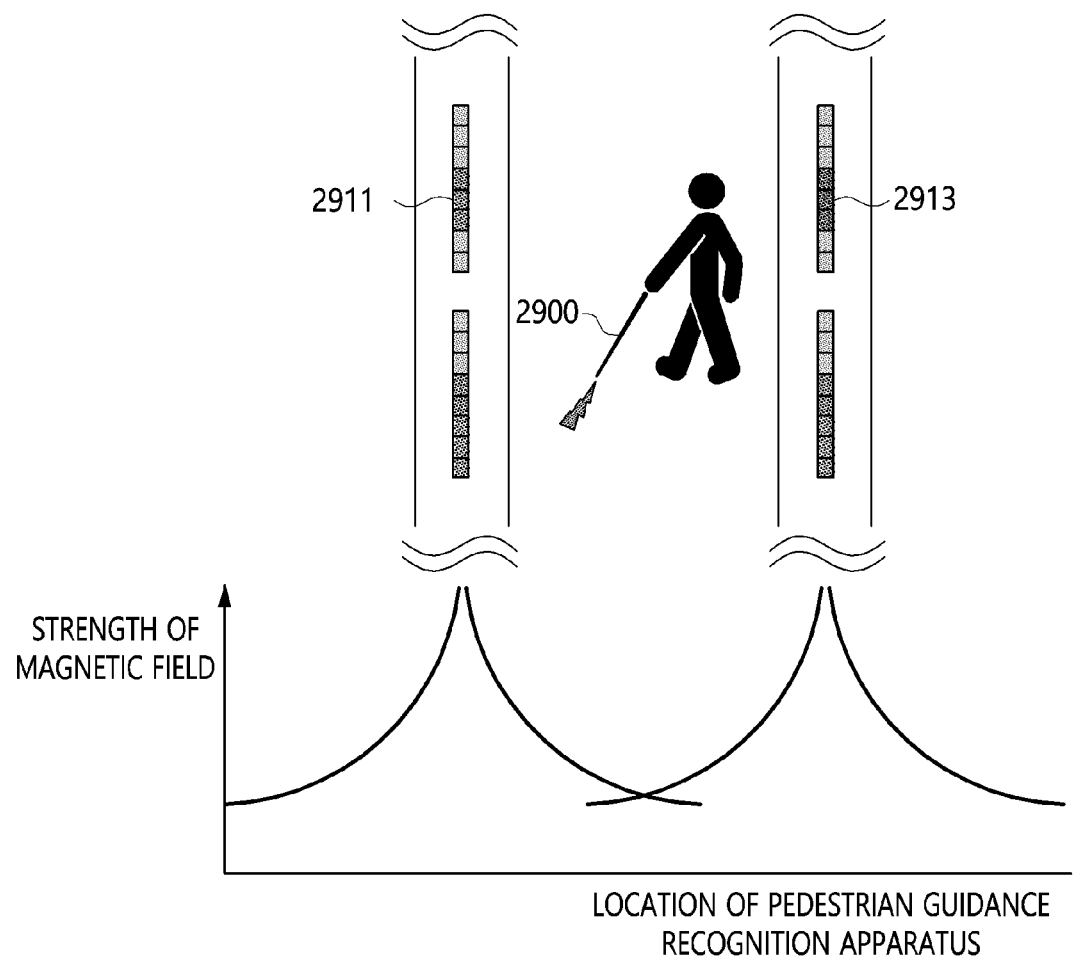
FIG. 29 is a graph illustrating the strength of a magnetic field depending on multiple magnetic patterns and the location of a pedestrian guidance recognition apparatus according to the present disclosure.

FIG. 29 is a graph illustrating the strength of a magnetic field depending on multiple magnetic patterns and the location of a pedestrian guidance recognition apparatus.

Referring to FIG. 29, the strengths of magnetic fields by a first magnetic pattern 2911 and a second magnetic pattern 2913 may vary depending on the location of a pedestrian guidance recognition apparatus 2900, which is located between the first magnetic pattern 2911 and the second magnetic pattern 2913.

Here, when the pedestrian guidance recognition apparatus 2900 according to an embodiment of the present disclosure comes closer to the first magnetic pattern 2911, the strength of the magnetic field by the first magnetic pattern 2911 increases, whereas when it comes closer to the second magnetic pattern 2913, the strength of the magnetic field by the second magnetic pattern 2913 increases, so a user carrying the pedestrian guidance recognition apparatus 2900 according to an embodiment of the present disclosure may detect his or her location in the sidewalk.

Also, using the strengths of the magnetic fields by the respective magnetic patterns 2911 and 2913, the user may be prevented from walking in a roadway or a dangerous area and may be guided to a safe path.

Here, the pedestrian guidance recognition apparatus 2900 according to an embodiment of the present disclosure may include two magnetic sensors, thereby guiding the user to move to the center of the sidewalk, as described above.

Figure 30:
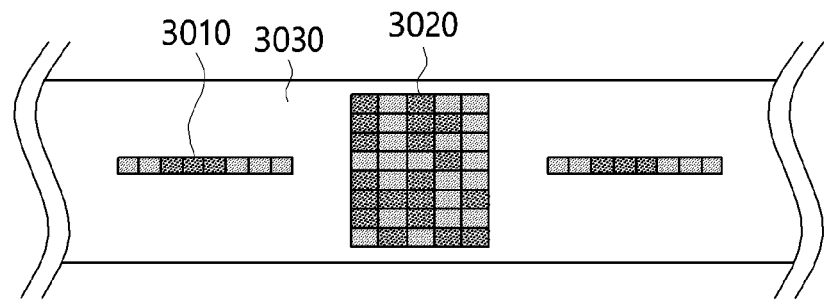
FIG. 30 is an exemplary view illustrating a pattern of magnetic paint applied to the ground according to the present disclosure.

FIG. 30 is an exemplary view illustrating the pattern of magnetic paint applied to the ground according to the present disclosure.

Conventional sidewalk blocks for the visually impaired may simply provide only direction information. However, according to an embodiment of the present disclosure, magnetic paint may be applied to form a pattern or an alternating pattern, whereby not only direction information but also location information or various kinds of other information may be provided.

Referring to FIG. 30, the pattern of magnetic paint applied to the ground 3030 according to an embodiment of the present disclosure may be formed as a one-dimensional pattern 3010, which is recorded in one dimension, and a two-dimensional pattern 3020, which is recorded in two dimensions.

Here, the one-dimensional pattern 3010 may provide information using a binary signal by setting the N-pole and S-pole of the magnetic paint to 1 and 0, respectively.

Here, describing an example of the one-dimensional pattern 1110, a magnetic pattern is formed using only the N-pole and the S-pole, as shown in Table 2, and location information (e.g., information about the exits of a subway station, and the like) may be provided using the binary signal of each pattern.

TABLE 2

| magnetic pattern | information |
| --- | --- |
| NNNNNNNS | North exit 1 |
| NNNNNNSS | North exit 2 |
| SSSSSSSN | South exit 1 |
| SSSSSSNN | South exit 2 |
| NNSSSNNN | West exit 1 |
| NNNSSSNN | West exit 2 |
| SSNNNSSS | East exit 1 |
| SSSNNNSS | East exit 2 |

Here, because the two-dimensional pattern 3020 can be formed like a Quick Response (QR) code, it may contain a greater amount of information than conventional patterns, and the above-described pieces of information may be visually or auditorily provided to a user by operating a magnetic field detection element (a magnetic sensor), or the like in conjunction with a user terminal, or the like.

Also, because the one-dimensional pattern 3010 and the two-dimensional patterns 3020 may include various colors, more various kinds of information may be contained therein by combining magnetic properties with optical properties.

Consequently, the one-dimensional pattern 3010 and the two-dimensional patterns 3020 may be formed using only an N-pole and an S-pole, or may be formed by adding three colors of red, green and blue (RGB) thereto.

Here, when magnetic properties and optical properties are combined, the amount of information that can be contained in a pattern is exponentially increased, compared to when a pattern is formed using only the magnetic properties, and because information can be recorded based on a base-6 number system, which has higher operation efficiency than a binary number system (N, S), much more information may be recorded per unit length or unit area. This may improve the reliability of information, because the accuracy of a resultant information amount is determined depending on the amount of initially input information when AI is used for a mobile electronic communication device.

That is, the one-dimensional pattern 3010 and the two-dimensional pattern 3020 according to an embodiment of the present disclosure may provide much more information by changing a magnetic pattern in the form of binary bits into multiple bits.

Also, a specific pattern according to an embodiment of the present disclosure may enable a user to easily collect information by telling the location of an optical pattern using a simple magnetic pattern or by telling the location of a magnetic pattern using an optical pattern, and this will be described in detail with reference to FIG. 35.

Also, because a specific pattern according to an embodiment of the present disclosure can be applied to flat sidewalk blocks having no tactile textures, unlike the conventional sidewalk blocks for the visually impaired, it is easily constructed and economical, and much more information may be set therein, compared to tactile textured sidewalk blocks.

Also, a specific pattern according to an embodiment of the present disclosure may be simply constructed, and has an advantage in that, when it is necessary to change information contained therein, the information may be easily modified.

Also, a specific pattern according to an embodiment of the present disclosure may provide convenience and safety to normal pedestrians as well as visually impaired people because it may be formed in various colors, and has an advantage in that an aesthetic impression may be secured because there is no limitation as to the color of paint.

Also, a specific pattern according to an embodiment of the present disclosure may provide information by combining a magnetic signal by a magnetic pattern with an optical signal by an optical pattern, or the magnetic signal and the optical signal may be formed to have the same pattern such that they are used in a mutually complementary manner.

For example, when the specific pattern according to an embodiment of the present disclosure is recorded using an N-pole and an S-pole, it is represented as respective colors corresponding to the poles, whereby the magnetic signal and the optical signal may be used in a mutually complementary manner.

Also, the specific pattern may have an effect of road markings for which magnetic paint is used, and, using the specific pattern, movement of a pedestrian and autonomous driving of a wheelchair or the like may be guided.

Figures 31, 32, 33:
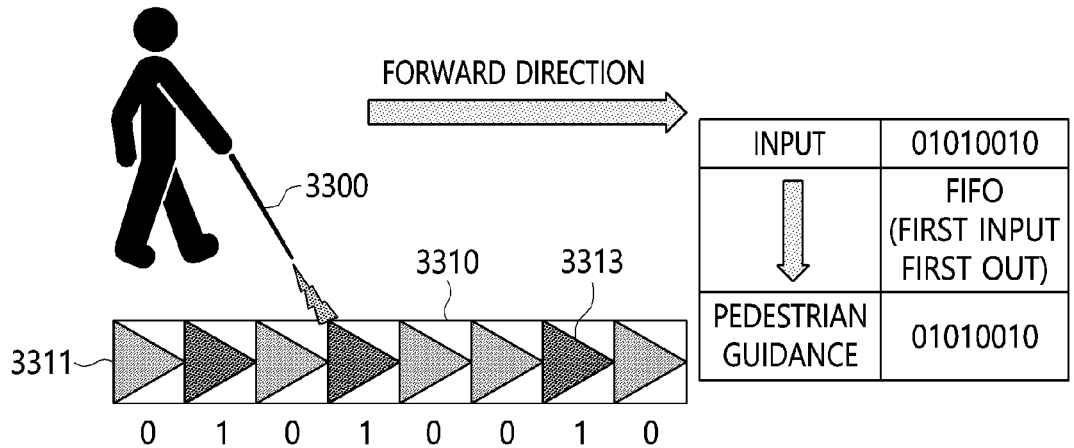
FIG. 31 is a table illustrating a signal for unit information provided to a pattern of magnetic paint according to the present disclosure.
FIG. 32 is a table illustrating an example of a base-6 number system generated through a complex pattern according to the present disclosure.
FIG. 33 is an exemplary view of generation of pedestrian guidance when walking in a forward direction according to the present disclosure.

FIG. 31 is a table illustrating a signal for unit information provided to a pattern of magnetic paint.

A complex pattern, in which the magnetic pattern and the optical pattern are combined, may record a large amount of information per unit length or unit area because each element thereof is able to represent much information.

Also, because a two-dimensional pattern is able to provide an exponentially large amount of information, compared to a one-dimensional pattern, it may provide a greater amount of information than that provided by an existing QR code.

Referring to FIG. 31, there is a great difference between the amount of information that can be generated through a one-dimensional complex pattern having a fixed length (e.g., 2) and having two elements and the amount of information that can be generated through a two-dimensional complex pattern (e.g., 2×2) corresponding to the fixed length.

Here, the one-dimensional complex pattern may provide up to 36 kinds of information using the two elements, but the two-dimensional complex pattern having the same length may provide 1296 kinds of information.

Accordingly, the complex pattern of a two-dimensional array, that is, the combination of a magnetic pattern and an optical pattern, may record an exponentially large amount of information, compared to the complex pattern of a one-dimensional array, and may provide much more information to a user.

FIG. 32 is a table illustrating an example of a base-6 number system generated through a complex pattern.

As described above, a magnetic pattern in the form of binary bits may be converted into multiple bits by processing the magnetic pattern using multiple colors according to an embodiment of the present disclosure, whereby much more information may be provided per unit length or unit area.

In the case of a mobile electronic communication device for which AI is used, the amount of initially input information affects the accuracy and amount of resultant information.

Referring to FIG. 32, the pattern according to an embodiment of the present disclosure may provide a binary signal configured with 0 and 1 through a one-dimensional magnetic pattern configured with an N-pole and an S-pole, and may provide a senary signal configured with 0, 1, 2, 3, 4, and 5 by adding three pieces of color information, including red, green, and blue (RGB), thereto, thereby providing more various kinds of information per unit length or unit area.

For example, the decimal number 128 converted into a binary number is 10000000, which requires a physical space for an 8-digit number. However, the decimal number 128 converted into a quaternary number is 2000, which requires only four digits, and the decimal number 128 converted into a base-6 number is 332, which requires only three digits, so the physical space therefor may be significantly reduced. As a result, much more information may be recorded per unit length or unit area.

Figure 34:
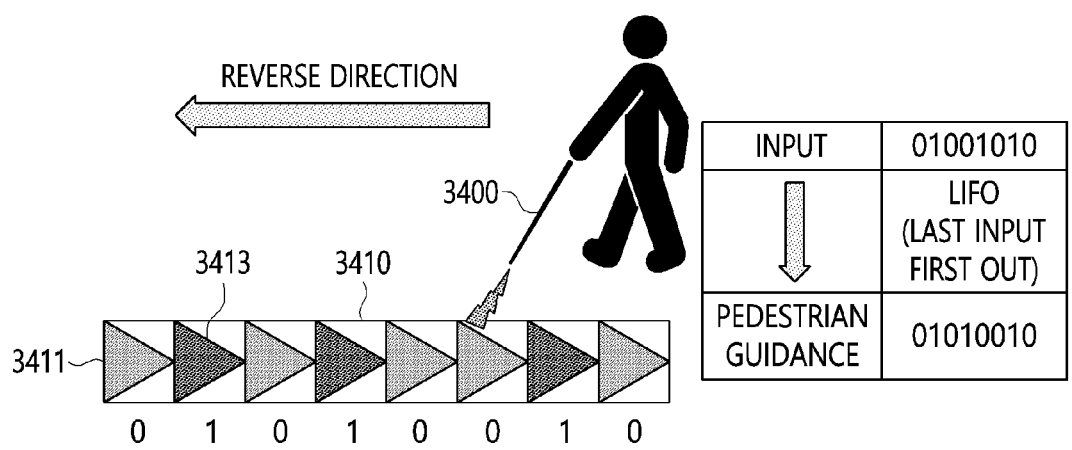
FIG. 34 is an exemplary view of generation of pedestrian guidance when walking in a reverse direction according to the present disclosure.

FIG. 33 is an exemplary view of generation of pedestrian guidance when a pedestrian is walking in a forward direction, and FIG. 34 is an exemplary view of generation of pedestrian guidance when pedestrian is walking in a reverse direction.

Referring to FIG. 33 and FIG. 34, it should be possible to read patterns 3310 and 3410 generated using magnetic paint both in a forward direction and in a reverse direction, rather than in one direction, and the pedestrian guidance recognition apparatuses 3300 and 3400 according to an embodiment of the present disclosure are required to generate the same pedestrian guidance when reading the patterns.

Accordingly, the patterns 3310 and 3410 according to an embodiment of the present disclosure are recorded symmetrically or asymmetrically such that a pedestrian clearly recognizes his or her direction, and signals input from the patterns 3310 and 3410 may be processed differently.

Also, each of the patterns 3310 and 3410 according to an embodiment of the present disclosure is formed as a magnetic pattern in which the frequency detected at the start point is set different from the frequency detected at the arrival point, thereby providing information about arrival at the destination.

Also, each of the patterns 3310 and 3410 according to an embodiment of the present disclosure may be provided to a user after being formed such that the frequency at the start point is the same as that at the destination but the frequency changes throughout the path from the start point to the destination.

Also, each of the patterns 3310 and 3410 according to an embodiment of the present disclosure is formed as an optical pattern and is symmetrically recorded such that the same information can be acquired regardless of the location from which the pattern is accessed, whereby an optical sensor (a color detection element) may be prevented from malfunctioning. Alternatively, a specific optical pattern is recorded at the start point and end point of the pattern, whereby the color detection element may be prevented from malfunctioning.

Referring to FIG. 33 and FIG. 34, a pedestrian carrying the pedestrian guidance recognition apparatus 3300 or 3400 according to an embodiment of the present disclosure may recognize a pattern formed of any one or more of a magnetic pattern, or an optical pattern, or a combination thereof while walking.

Here, the pattern 3310 or 3410 is a magnetic pattern or an optical pattern, and may provide a binary signal of 0 (3311 or 3411) and 1 (3313 or 3413), and the shape of the pattern may be formed to include movement direction information and to have directionality depending on the forward direction or the reverse direction based on the pedestrian guidance.

For example, referring to FIG. 33 and FIG. 34, the patterns 3310 and 3410 may be formed to have a triangular shape indicating a forward direction, and may enable an optical sensor included in the pedestrian guidance recognition apparatus 3300 or 3400 according to an embodiment of the present disclosure to determine the direction of walking by recognizing the shape of the pattern.

Also, as described above, the pedestrian guidance recognition apparatus 3300 or 3400 according to an embodiment of the present disclosure may differently process the input signals included in the patterns 3310 and 3410 by identifying the forward direction and the reverse direction.

As illustrated in FIG. 33, when a pedestrian carrying the pedestrian guidance recognition apparatus 3300 according to an embodiment of the present disclosure is walking in the forward direction while recognizing the pattern 3310, the signal input to the pedestrian guidance recognition apparatus may be 01010010.

Here, when it determines that the direction is the forward direction based on the shape of the pattern 3310 input through the optical sensor, the pedestrian guidance recognition apparatus 33400 may extract pedestrian guidance by processing the signal in a First-Input First-Out (FIFO) manner, in which case the pedestrian guidance may be 01010010.

Also, as illustrated in FIG. 34, when a pedestrian carrying the pedestrian guidance recognition apparatus 3400 according to an embodiment of the present disclosure is walking in the reverse direction while recognizing the pattern 3410, the signal input to the pedestrian guidance recognition apparatus 3400 may be 01001010.

Here, when it determines that the direction is the reverse direction based on the shape of the pattern 3410 input through the optical sensor, the pedestrian guidance recognition apparatus 3400 may extract pedestrian guidance by processing the signal in a Last-Input First-Out (LIFO) manner, in which case the pedestrian guidance may be 01010010.

Figure 35:
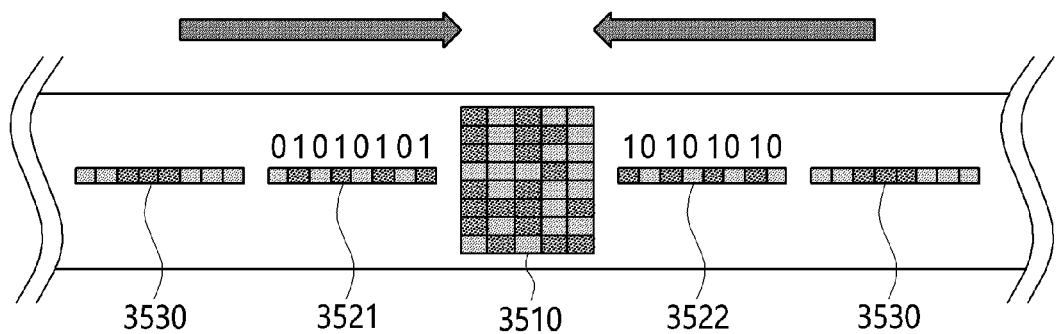
FIG. 35 is an exemplary view of control of an optical sensor by a magnetic sensing signal according to the present disclosure.

FIG. 35 is an exemplary view of control of an optical sensor by a magnetic sensing signal.

According to an embodiment of the present disclosure, the magnetic patterns 3521, 3522, and 3530 and the optical pattern 3510 may be designed to have different functions.

In an embodiment of the present disclosure, magnetic paint or the magnetic patterns 3521, 3522, and 3530 may provide only direction information for indicating the location of the optical pattern 3510, and the optical pattern 3510 found at the corresponding location may provide various kinds of other information, whereby the roles thereof may be divided.

Here, the optical pattern 3510 may use a large number of colors for respective information units, as described above, thereby providing a greater amount of information than existing methods. An example of such information may include information about buildings, a location, a pedestrian-only road, nearby tourism information, and the like.

Here, when an optical sensor always operates, which may cause a waste of power, and because there is a limit on the capacity of a portable battery, the optical sensor may be made operate only when a specific magnetic pattern 3521 or 3522 is input.

For example, referring to FIG. 35, the one-dimensional magnetic patterns 3521, 3522, and 3530 may provide a user with the current location and information about the location of the optical pattern 3510.

Here, because the optical pattern 3510 is formed in two dimensions, it may provide various kinds of information, such as detailed information about the corresponding location, nearby tourism information, and the like.

Here, each of the magnetic patterns 3521 and 3522 near the optical pattern 3510 is formed as an arbitrarily set specific pattern (e.g., 01010101), so that the pedestrian guidance recognition apparatus according to an embodiment of the present disclosure may operate the optical sensor when it recognizes the magnetic pattern 3521 or 3522 having the specific pattern.

Also, because it should be possible to operate the optical sensor at the same location even when a pedestrian carrying the pedestrian guidance recognition apparatus according to an embodiment of the present disclosure walks in the reverse direction, the magnetic patterns 3521 and 3522 that are adjacent to the optical pattern 3510 and symmetrically placed based on the optical pattern 3510 may be formed as patterns that are symmetrical to each other.

In FIG. 35, the shade of each of the patterns 3510, 3521, 3522, and 3530 is illustrated as having two levels, but it is not limited thereto. Also, each of the magnetic patterns 3521, 3522, and 3530 is illustrated as a one-dimensional pattern and the optical pattern 3510 is illustrated as a two-dimensional pattern, but they are not limited thereto.

Figure 36:
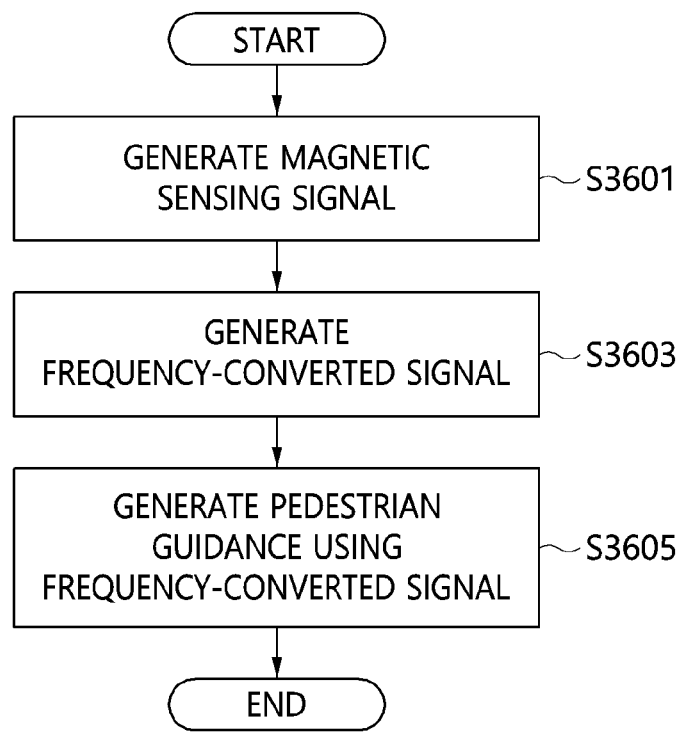
FIG. 36 is a flowchart illustrating a method for recognizing pedestrian guidance using multiple magnetic sensors according to an embodiment of the present disclosure.

FIG. 36 is a flowchart of a method for recognizing pedestrian guidance using multiple magnetic sensors according to an embodiment of the present disclosure.

Referring to FIG. 36, in the method for recognizing pedestrian guidance using multiple magnetic sensors according to an embodiment of the present disclosure, first, a magnetic sensing signal is generated from magnetic paint applied to the ground at step S3601.

Also, in the method for recognizing pedestrian guidance using multiple magnetic sensors according to an embodiment of the present disclosure, a frequency-converted signal is generated using the magnetic sensing signal at step S3603.

Also, in the method for recognizing pedestrian guidance using multiple magnetic sensors according to an embodiment of the present disclosure, pedestrian guidance is generated using the frequency-converted signal at step S3605.

Here, the frequency-converted signal may be generated by generating detection signals by detecting the magnetic sensing signal at preset periods, generating average signals by averaging a preset number of detection signals, collecting a number of average signals corresponding to a preset conversion unit or collecting the average signals for a preset time period, and performing frequency conversion thereon.

Here, the magnetic sensing signal may include a first magnetic sub-signal generated from the magnetic paint through a first magnetic sensor and a second magnetic sub-signal generated from the magnetic paint through a second magnetic sensor.

Here, the frequency-converted signal may be generated using a noise-reduced signal generated using the difference between the first magnetic sub-signal and the second magnetic sub-signal.

Here, the noise-reduced signal may be generated using the differences between the average signals corresponding to the first magnetic sub-signal and the average signals corresponding to the second magnetic sub-signal.

Here, the method for recognizing pedestrian guidance using multiple magnetic sensors according to an embodiment of the present disclosure may further include generating direction information of the magnetic paint using the difference between the time at which the first magnetic sub-signal is received and the time at which the second magnetic sub-signal is received.

Here, the method for recognizing pedestrian guidance using multiple magnetic sensors according to an embodiment of the present disclosure may further include generating an optical sensing signal from the magnetic paint, and pedestrian guidance may be generated using any one or more of the frequency-converted signal, or the optical sensing signal, or a combination thereof at step S3605.

Here, the magnetic sensing signal may correspond to a one-dimensional magnetic pattern or a two-dimensional magnetic pattern.

Here, the optical sensing signal is configured to subdivide the magnetic pattern corresponding to the magnetic sensing signal, thereby increasing the amount of information per unit length or unit area, compared to when only the magnetic sensing signal is used.

FIG. 37 is a view illustrating a computer system according to an embodiment of the present disclosure.

Referring to FIG. 37, an embodiment of the present disclosure may be implemented in a computer system such as a computer-readable recording medium. As illustrated in FIG. 37, the computer system 3700 may include one or more processors 3710, memory 3730, a user-interface input device 3740, a user-interface output device 3750, and storage 3760, which communicate with each other via a bus 3720. Also, the computer system 3700 may further include a network interface 3770 connected to a network 3780. The processor 3710 may be a central processing unit or a semiconductor device for executing processing instructions stored in the memory 3730 or the storage 3760. The memory 3730 and the storage 3760 may be any of various types of volatile or nonvolatile storage media. For example, the memory may include ROM 3731 or RAM 3732.

Here, the apparatus for recognizing pedestrian guidance using multiple magnetic sensors according to an embodiment of the present disclosure may include a magnetic sensor for generating a magnetic sensing signal from magnetic paint applied to the ground, a frequency conversion unit for generating a frequency-converted signal using the magnetic sensing signal, and a control unit for generating pedestrian guidance using the frequency-converted signal.

Here, the frequency conversion unit may generate detection signals by detecting the magnetic sensing signal at preset periods, generate average signals by averaging a preset number of detection signals, collect a number of average signals corresponding to a preset conversion unit or collect the average signals for a preset time period, and perform frequency conversion thereon, thereby generating the frequency-converted signal.

Here, the magnetic sensing signal may include a first magnetic sub-signal generated from the magnetic paint through a first magnetic sensor and a second magnetic sub-signal generated from the magnetic paint through a second magnetic sensor.

Here, the frequency-converted signal may be generated using a noise-reduced signal generated using the difference between the first magnetic sub-signal and the second magnetic sub-signal.

Here, the noise-reduced signal may be generated using the differences between the average signals corresponding to the first magnetic sub-signal and the average signals corresponding to the second magnetic sub-signal.

Here, the control unit may generate direction information of the magnetic paint using the difference between the time at which the first magnetic sub-signal is received and the time at which the second magnetic sub-signal is received.

Here, the apparatus for recognizing pedestrian guidance using multiple magnetic sensors according to an embodiment of the present disclosure may further include an optical sensor for generating an optical sensing signal from the magnetic paint, and the control unit may generate pedestrian guidance using any one or more of the frequency-converted signal, or the optical sensing signal, or a combination thereof.

Here, the magnetic sensing signal may correspond to a one-dimensional magnetic pattern or a two-dimensional magnetic pattern.

Here, the optical sensing signal is configured to subdivide the magnetic pattern corresponding to the magnetic sensing signal, thereby increasing the amount of information per unit length or unit area, compared to when only the magnetic sensing signal is used.

Here, the control unit may correspond to the processor 3700 of the computer system, the magnetic sensor and the optical sensor may communicate with the processor 3700 via the bus 3720, and the generated magnetic sensing signal and the optical sensing signal may be stored in the memory 3730 or the storage 3760.

Accordingly, an embodiment of the present disclosure may be implemented as a non-transitory computer-readable medium in which methods implemented using a computer or instructions executable in a computer are recorded. When the computer-readable instructions are executed by a processor, the computer-readable instructions may perform a method according to at least one aspect of the present disclosure.

As described above, the method and apparatus for recognizing driving information using multiple magnetic sensors according to the present disclosure are not limitedly applied to the configurations and operations of the above-described embodiments, but all or some of the embodiments may be selectively combined and configured, so the embodiments may be modified in various ways.

The invention claimed is:

1. A method for recognizing driving information, comprising:
   generating a magnetic sensing signal from magnetic paint applied to road markings;
   generating a frequency-converted signal using the magnetic sensing signal;
   generating driving information for a vehicle using the frequency-converted signal; and
   detecting a vibration frequency by a vibration sensor installed in the vehicle while the magnetic sensing signal is being generated wherein the magnetic sensing signal includes a first magnetic sub-signal generated from the magnetic paint through a first magnetic sensor and a second magnetic sub-signal generated from the magnetic paint through a second magnetic sensor, wherein the frequency-converted signal is generated using an additional noise-reduced signal acquired by further removing noise corresponding to the vibration frequency from the noise-reduced signal generated using a difference between the first magnetic sub-signal and the second magnetic sub-signal.

2. The method of claim 1, wherein the frequency-converted signal is generated by generating detection signals by detecting the magnetic sensing signal at preset periods, generating average signals by averaging a preset number of detection signals, collecting the average signals for a preset time period, and performing frequency conversion thereon.

3. The method of claim 2, wherein the noise-reduced signal is generated using differences between the average signals corresponding to the first magnetic sub-signal and the average signals corresponding to the second magnetic sub-signal.

4. The method of claim 2, further comprising:
generating direction information of the magnetic paint using a difference between a time at which the first magnetic sub-signal is received and a time at which the second magnetic sub-signal is received.

5. The method of claim 1, further comprising:
generating an optical sensing signal from the magnetic paint,
wherein generating the driving information comprises generating the driving information using any one or more of the frequency-converted signal, or the optical sensing signal, or a combination thereof.

6. The method of claim 5, wherein the magnetic sensing signal corresponds to a one-dimensional magnetic pattern or a two-dimensional magnetic pattern.

7. The method of claim 5, wherein the optical sensing signal is configured to subdivide a magnetic pattern corresponding to the magnetic sensing signal, thereby increasing an amount of information per unit length or unit area, compared to when only the magnetic sensing signal is used.

8. An apparatus for recognizing driving information, comprising:

a magnetic sensor for generating a magnetic sensing signal from magnetic paint applied to road markings;
a processor configured to:
generate a frequency-converted signal using the magnetic sensing signal;
generate driving information for a vehicle using the frequency-converted signal; and
a vibration sensor for detecting a vibration frequency while the magnetic sensing signal is being generated,
wherein the magnetic sensing signal includes a first magnetic sub-signal generated from the magnetic paint through a first magnetic sensor and a second magnetic sub-signal generated from the magnetic paint through a second magnetic sensor,
wherein the frequency-converted signal is generated using an additional noise-reduced signal acquired by further removing noise corresponding to the vibration frequency from the noise-reduced signal generated using a difference between the first magnetic sub-signal and the second magnetic sub-signal.

9. The apparatus of claim 8, wherein the frequency-converted signal is generated by generating detection signals by detecting the magnetic sensing signal at preset periods, generating average signals by averaging a preset number of detection signals, collecting the average signals for a preset time period, and performing frequency conversion thereon.

10. The apparatus of claim 9, wherein the noise-reduced signal is generated using differences between the average signals corresponding to the first magnetic sub-signal and the average signals corresponding to the second magnetic sub-signal.

11. The apparatus of claim 9, wherein the control unit generates direction information of the magnetic paint using a difference between a time at which the first magnetic sub-signal is received and a time at which the second magnetic sub-signal is received.

12. The apparatus of claim 8, further comprising:
an optical sensor for generating an optical sensing signal from the magnetic paint,
wherein the processor generates the driving information using any one or more of the frequency-converted signal, or the optical sensing signal, or a combination thereof.

* * * * *